United States Patent
Aoki et al.

(10) Patent No.: US 9,606,880 B2
(45) Date of Patent: Mar. 28, 2017

(54) INFORMATION PROCESSING APPARATUS, INFORMATION PROCESSING SYSTEM, AND CONTROL METHOD THEREFOR

(71) Applicant: FUJITSU LIMITED, Kawasaki-shi, Kanagawa (JP)

(72) Inventors: Yuji Aoki, Nagoya (JP); Maya Watanabe, Nagoya (JP)

(73) Assignee: FUJITSU LIMITED, Kawasaki (JP)

( * ) Notice: Subject to any disclaimer, the term of this patent is extended or adjusted under 35 U.S.C. 154(b) by 563 days.

(21) Appl. No.: 14/226,218

(22) Filed: Mar. 26, 2014

(65) Prior Publication Data
US 2014/0298114 A1    Oct. 2, 2014

(30) Foreign Application Priority Data
Mar. 28, 2013  (JP) .................. 2013-069827

(51) Int. Cl.
*G06F 15/173*    (2006.01)
*G06F 11/20*    (2006.01)

(52) U.S. Cl.
CPC ...... *G06F 11/2028* (2013.01); *G06F 11/2038* (2013.01); *G06F 11/2048* (2013.01)

(58) Field of Classification Search
USPC ........................................................ 709/224
See application file for complete search history.

(56) References Cited

U.S. PATENT DOCUMENTS 5,329,528 A * 7/1994 Akai .................. H04L 12/417
                                                        370/445

FOREIGN PATENT DOCUMENTS

| JP | 64-013637 | 1/1989 |
|----|-----------|--------|
| JP | 04-289949 | 10/1992 |
| JP | 5-327713 A | 12/1993 |
| JP | 06-019810 | 1/1994 |
| JP | 07-152701 | 6/1995 |
| JP | 2000-148563 | 5/2000 |
| JP | 2003-337717 | 11/2003 |
| JP | 2009-9371 A | 1/2009 |

OTHER PUBLICATIONS

Japanese Office Action mailed Oct. 4, 2016 for corresponding Japanese Patent Application No. 2013-069827, with Partial English Translation, 7 pages.

* cited by examiner

*Primary Examiner* — Hee Soo Kim
(74) *Attorney, Agent, or Firm* — Fujitsu Patent Center

(57) ABSTRACT

A first information processing apparatus executes an operation corresponding to a message entered thereto. Upon completion of the operation, the first information processing apparatus sends a notification to a second information processing apparatus. The second information processing apparatus stores such notifications in a memory. The second information processing apparatus also receives a message, and upon expiration of a predetermined time after receipt of the message, the second information processing apparatus determines whether the memory contains a notification relevant to the received message. When the memory contains such a notification, the second information processing apparatus avoids execution of an operation corresponding to the received message.

8 Claims, 28 Drawing Sheets

FIG. 8

| EVENT TIMESTAMP | EVENT ID | SOURCE DEVICE NAME | ACTION TYPE | EXECUTION STATUS |
|---|---|---|---|---|
| 2012/01/13 10:11:40 | 101 | host1 | E-MAIL NOTIFICATION | EXECUTED (SUCCESS) |
| 2012/01/13 10:12:16 | 102 | host1 | SNMP TRAP | EXECUTED (SUCCESS) |
| ⋮ | ⋮ | ⋮ | ⋮ | ⋮ |
| 2012/03/21 19:21:15 | 191 | host1 | E-MAIL NOTIFICATION | EXECUTED (FAIL) |
| 2012/03/21 19:21:15 | 191 | host1 | E-MAIL NOTIFICATION | IN EXECUTION |

VARIATION #1

| No. | ACTION TYPE | EXECUTION TIME | | | |
|---|---|---|---|---|---|
| | | 1ST | 2ND | ... | AVERAGE |
| 1 | E-MAIL NOTIFICATION | 2 s | 2 s | ... | 2 s |
| 2 | VOICE MESSAGE | 5 s | 4 s | ... | 4 s |
| 3 | SHORT MAIL NOTIFICATION | 1 s | 2 s | ... | 1 s |
| | VOICE MESSAGE | 10 s | 11 s | ... | 10 s |
| 4 | PROGRAM EXECUTION | 3 s | 4 s | ... | 4 s |

GENERATE POLLING INTERVAL TABLE

VARIATION #1

VARIATION #2

VARIATION #2

| No. | ACTION | EXECUTION TIME | MEMORY CONSUMP-TION | CPU USAGE | ACTION LOAD |
|---|---|---|---|---|---|
| 1 | E-MAIL NOTIFICATION | 1 s | 50 KB | 1% | 50 |
| 2 | VOICE MESSAGE | 2 s | 200 KB | 5% | 2000 |
| ⋮ | ⋮ | ⋮ | ⋮ | ⋮ | ⋮ |

GENERATE ACTION LOAD TABLE

VARIATION #2

FIG. 26

VARIATION #3

| SOURCE DEVICE NAME | EVENT TIMESTAMP |
|---|---|
| host1 | 2012/01/13 10:11:40 |
| host2 | 2012/03/21 19:21:20 |

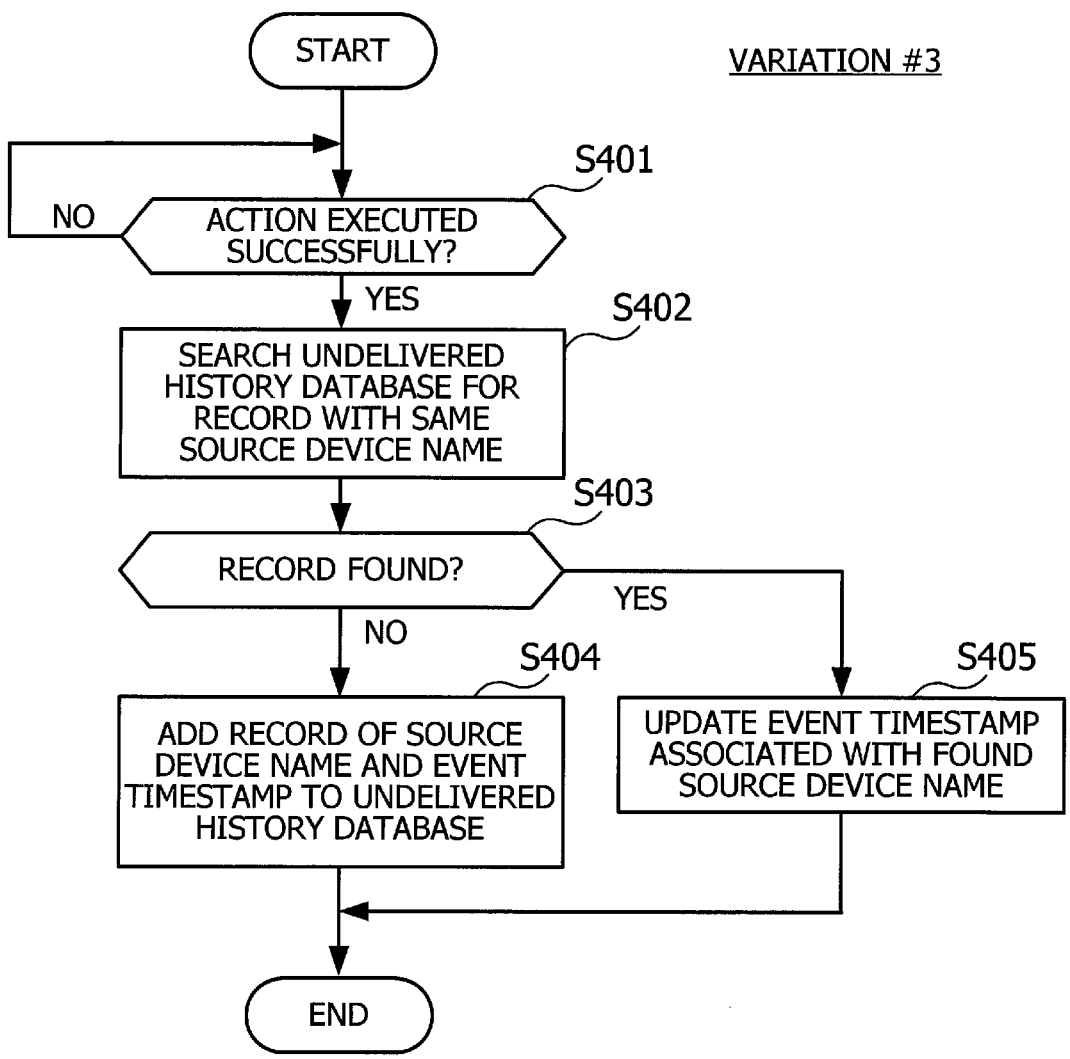

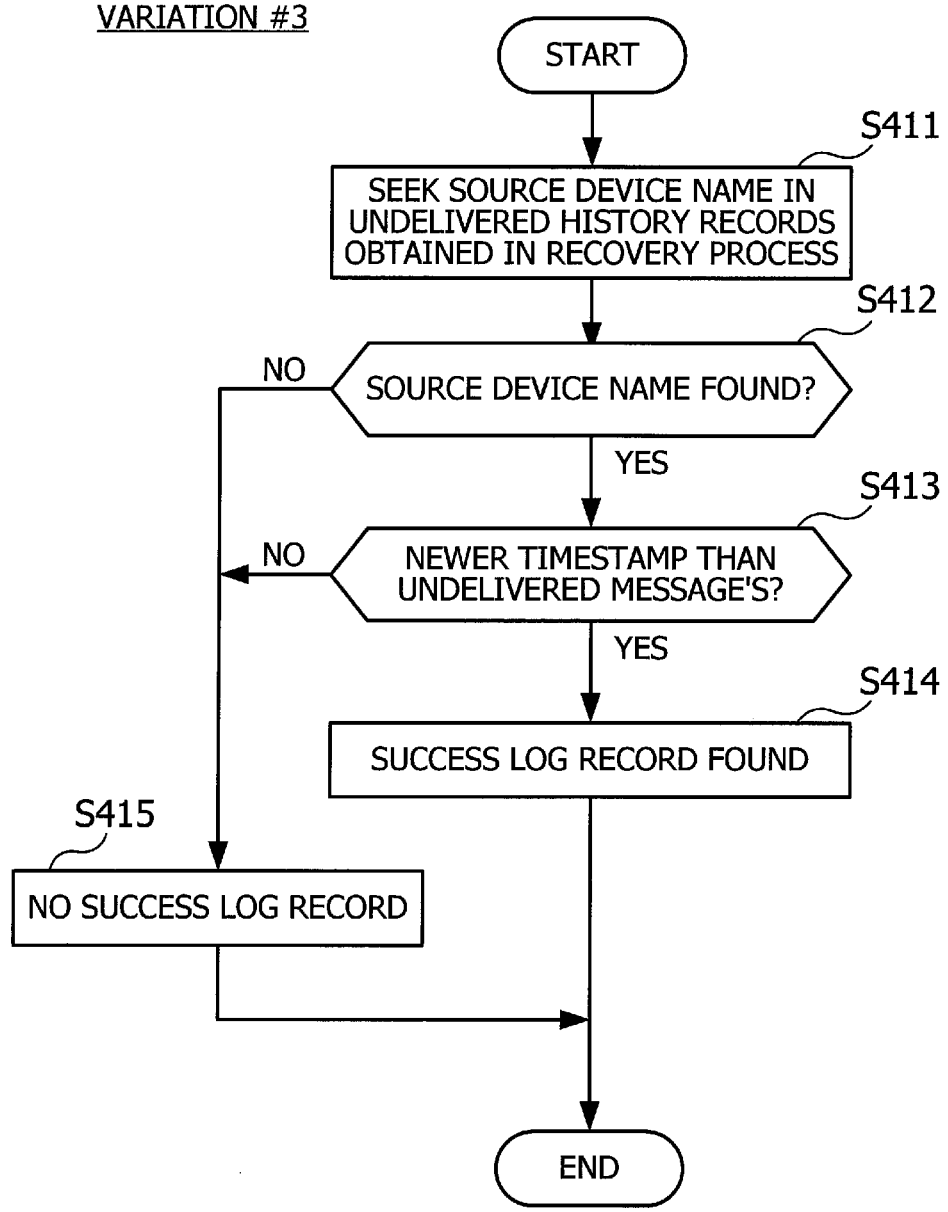

INFORMATION PROCESSING APPARATUS, INFORMATION PROCESSING SYSTEM, AND CONTROL METHOD THEREFOR

CROSS-REFERENCE TO RELATED APPLICATION

This application is based upon and claims the benefit of priority of the prior Japanese Patent Application No. 2013-069827, filed on Mar. 28, 2013, the entire contents of which are incorporated herein by reference.

FIELD

The embodiments discussed herein relate to an information processing apparatus, an information processing system, and a control method therefor.

BACKGROUND

Some existing information processing systems are made up of two or more information processing apparatuses uniformly configured to provide the same functions by, for example, running the same set of software programs. This redundant system configuration is for the purpose of a higher degree of fault tolerance, so that even if one information processing apparatus fails, another information processing apparatus can take over its processing tasks. The information processing apparatus currently responsible for the service is called, for example, a "primary," "active," or "working" subsystem. The remaining information processing apparatus is called a "secondary," "standby," or "backup" subsystem.

The secondary apparatus is not necessarily inactive. For quick failover operation and shorter system down time, some redundant systems are configured to maintain the secondary information processing apparatus in operable state even when the primary information processing apparatus is working properly. The secondary information processing apparatus may even keep supplied with the same input data that the primary information processing apparatus receives during the normal operation.

There is proposed, for example, a dual-redundant monitoring system that monitors wireless equipment and the like by using two computers, one for "working" and the other for "backup." In this system, a detector device sends alarm data to both the working computer and backup computer when a failure is found in the monitored equipment. The two computers produce their respective statistical data. While two sets of statistical data are present, a switch selects the one produced by the working computer and sends it out to a printer.

There is also proposed a multi-server computing system formed from an active server and a standby server. The standby server has a database whose content is consistent with the active server's. This multi-server computing system is coupled with a terminal computer, which requests both the active and standby servers to update their databases. The two servers update their respective databases in accordance with the requests. The active server then returns a response to the requesting terminal computer, whereas the standby server does not. See, for example, the following documents:
Japanese Laid-open Patent Publication No. 64-13637
Japanese Laid-open Patent Publication No. 2000-148563

Suppose now that a redundant system includes a primary information processing apparatus and a secondary information processing apparatus, configured to receive the same input data when they are in normal condition. It is only the primary information processing apparatus that actually performs requested actions (e.g., outputting data to printer, returning response). One issue in this redundant system is how to implement switchover from primary to secondary when the primary apparatus encounters a failure.

In the case of the first-mentioned dual-redundant monitoring system, an external switch performs switchover between the working computer and backup computer. In the case of the second-mentioned multi-server computing system, each server is supposed to be aware of whether it is an active server or a standby server. Switchover may take place according to an external command (e.g., reconfiguration command from the user), with the possibility of a large delay before switchover is finished.

It is noted that the primary and secondary information processing apparatuses are not always be able to receive input data exactly at the same time. Such timing differences would complicate the system's decision of which apparatus is to execute actions in the case of failure. For this reason, the switchover is preferably controlled so as not to cause duplicated actions for a single input of data. That is, the then-primary information processing apparatus may have finished some actions in response to received data. It is preferable for the new primary information processing apparatus to avoid executing these actions again.

SUMMARY

According to an aspect of the embodiments to be discussed herein, there is provided an information processing apparatus including: a communication interface configured to receive a notification indicating a processing status of an operation that another information processing apparatus executes, corresponding to a message entered thereto; a memory configured to store notifications received by the communication interface; and a processor configured to determine, upon expiration of a predetermined time after receipt of a message by the information processing apparatus, whether the memory contains a notification indicating a processing status of an operation corresponding to the received message, and avoid execution of an operation corresponding to the received message when the memory is determined to contain the notification.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of a peer device history database according to the second embodiment;

FIG. 26 illustrates an example of an undelivered history database according to a third variation (variation #3) of the second embodiment;

FIG. 27 is a flowchart explaining how the undelivered history database is updated according to the third variation (variation #3) of the second embodiment; and FIG. 28 is a flowchart explaining how the presence of a success log record is determined based on the undelivered history database according to the third variation (variation #3) of the second embodiment.

DESCRIPTION OF EMBODIMENTS

Several embodiments and variations will be described below with reference to the accompanying drawings.

I. First Embodiment

Figure 1:
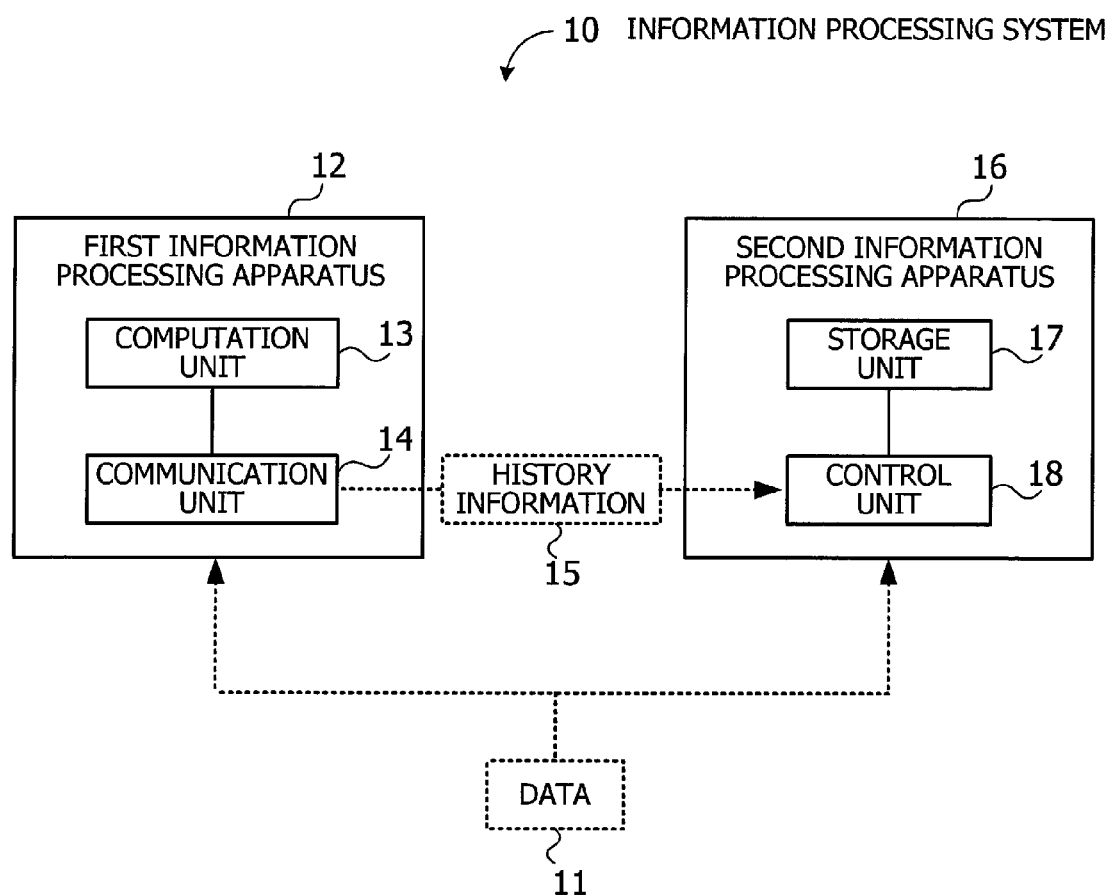
FIG. 1 illustrates an example of an information processing system according to a first embodiment.

This chapter describes a first embodiment with reference to an example of an information processing system illustrated in FIG. 1. The illustrated information processing system 10 includes a first information processing apparatus 12 and a second information processing apparatus 16, configured to receive data 11 equally. The first information processing apparatus 12 includes a computation unit 13 and a communication unit 14, while the second information processing apparatus 16 includes a storage unit 17 and a control unit 18.

The computation unit 13 executes an action upon receipt of data 11. Here the term "action" refers to, for example, sending an e-mail message, sending a voice message, executing an application program, issuing a remote command, issuing a Simple Network Management Protocol (SNMP) trap, and displaying a pop-up message.

The communication unit 14 sends a piece of history information 15 to the second information processing apparatus 16 upon successful completion of the above action. This history information 15 indicates the data that has caused the action. In other words, it indicates the data that has been accepted and processed by executing its associated action.

The storage unit 17 in the second information processing apparatus 16 stores the history information 15 received from the first information processing apparatus 12. The stored information may indicate, for example, the type and execution status of actions. Specifically, the execution status of an action indicates whether the action has already been done or is still in the process of execution. In the former case, it also indicates whether the action has successfully been finished or has failed.

The control unit 18 determines, upon receipt of the data 11, whether or not to execute the action in the second information processing apparatus 16 as an alternative to the first information processing apparatus 12, based on the presence and content of the history information 15 in the storage unit 17. For example, the control unit 18 determines not to execute the action for the received data 11 when its corresponding history information 15 is found in the storage unit 17. When no relevant history information is found in the storage unit 17, the control unit 18 determines that the second information processing apparatus 16 is to execute the action.

II. Second Embodiment

This chapter describes a second embodiment.

(i) Information Processing System

Figure 2:
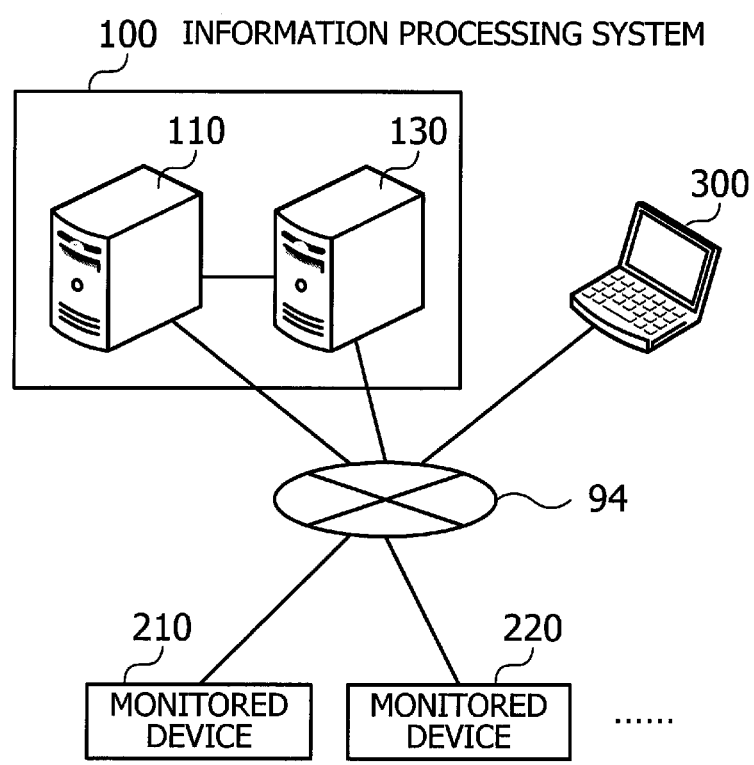
FIG. 2 illustrates an example of an information processing system according to a second embodiment.

Referring to FIG. 2, this section describes an example of an information processing system according to a second embodiment. The illustrated information processing system 100 includes a first information processing apparatus 110 and a second information processing apparatus 130 which are connected to each other via a link. The first information processing apparatus 110 and second information processing apparatus 130 are also connected to monitored devices 210 and 220 and a terminal device 300 via a network 94. While FIG. 2 illustrates two monitored devices 210 and 220, the second embodiment is not limited by this specific example. For example, the information processing system 100 may monitor a single device or three or more devices.

(ii) Monitored Devices

When some event occurs in one monitored device 210, the monitored device 210 sends a message to both the first information processing apparatus 110 and second information processing apparatus 130. Besides indicating what type of event it is, this message provides more specific information about the event. More specifically, the message from the monitored device 210 includes an event timestamp and an event ID to distinguish the particular event from others. For example, the monitored devices individually assign an event ID to each event in the order of occurrence.

What is regarded as an "event" may vary depending on what type of device the monitored device 210 is, as well as on what kind of software programs are running on the monitored device 210. For example, when the monitored device 210 is an application server, the possible events include warnings and error messages issued by application software running thereon. When it is a job server, failed execution of a job or completed execution of a job may be detected as events. Other possible events are network disconnection and memory write error.

The monitored device 210 may send messages to the first information processing apparatus 110 and second information processing apparatus 130, not only at the real time of events, but also on a regular basis to provide information extracted from its event log. For example, the monitored device 210 may send its system log records that indicate how the operating system is working, application log records that indicate how application programs are running, or security log records that indicate log-on history of users.

As described above, the monitored device 210 sends a message to the first information processing apparatus 110 and second information processing apparatus 130 to report an event that has occurred in the monitored device 210. This message, however, may not be received properly by the first information processing apparatus 110 or second information processing apparatus 130. When this is the case, the monitored device 210 saves the message as an undelivered message.

Suppose, for example, that the monitored device 210 sends a message, but the first information processing apparatus 110 happens to be down for some reason. In this case, the monitored device 210 receives no acknowledgment from the first information processing apparatus 110, meaning that the message has not reached the first information processing apparatus 110. The monitored device 210 thus saves the message as an undelivered message addressed to the first information processing apparatus 110. Another monitored device 220 is also configured to do the same when it encounters similar situations.

(iii) First and Second Information Processing Apparatuses

When a message arrives from monitored devices 210 and 220, the first information processing apparatus 110 or second information processing apparatus 130 executes an action corresponding to the type of the received message. This action may be, for example, e-mail notification, voice notification, application execution, remote command issuance, SNMP trap issuance, and pop-up display. These action types are associated with different event types. For example, the action of e-mail notification is associated with disk error events. The action of voice notification is associated with application warning events. The action of e-mail notification and voice notification is associated with application error events.

More specifically, e-mail notification is an action that sends the user of the terminal device 300 an e-mail message that indicates occurrence of an event, as well as providing some details of the event. Voice notification is an action that sends a voice message to notify the user of the terminal device 300 of the occurrence of an event and to vocally describe the event. Pop-up display is an action that displays a pop-up window on a screen of the terminal device 300 to notify the user of the occurrence of an event and to provide some details of that event. Other actions similarly provide the user with a notice and information of an event, or suggestion of how to deal with an event, or the result of actions taken for an event.

An action corresponding to a single message is executed in either the first information processing apparatus 110 or the second information processing apparatus 130. In this regard, one of the first information processing apparatus 110 and second information processing apparatus 130 serves as a "primary" apparatus, while the other serves as a "secondary" apparatus. The primary apparatus is supposed to execute an action corresponding to a received message with priority over the secondary apparatus. In contrast, the secondary apparatus stays on standby, without executing any action, as long as the primary apparatus can do it. The first information processing apparatus 110 and second information processing apparatus 130 have their respective attributes specifying which one is primary and which one is secondary. When specified as the primary apparatus, the first information processing apparatus 110 is primarily responsible for executing actions corresponding to received messages.

When the first information processing apparatus 110 stops for some reason, the second information processing apparatus 130 executes an action corresponding to a message that is received. The second information processing apparatus 130 further changes its own attribute from secondary to primary. The first information processing apparatus 110 may recover some time later. Upon recovery, the first information processing apparatus 110 changes its own attribute from primary to secondary, thus starting to work as a secondary apparatus. In this way, the two information processing apparatuses 110 and 130 watch each other's activity and change their attributes according to each other's condition.

An example of the proposed information processing system of the second embodiment has been outlined above. While the first information processing apparatus 110 in FIG. 2 is connected directly with the second information processing apparatus 130, the second embodiment is not limited by that specific example. Alternatively, the network 94 in FIG. 2 may be the only link between the two information processing apparatuses. The following description will assume, however, that the first information processing apparatus 110 and second information processing apparatus 130 are connected directly.

(iv) Hardware of First Information Processing Apparatus

Figure 3:
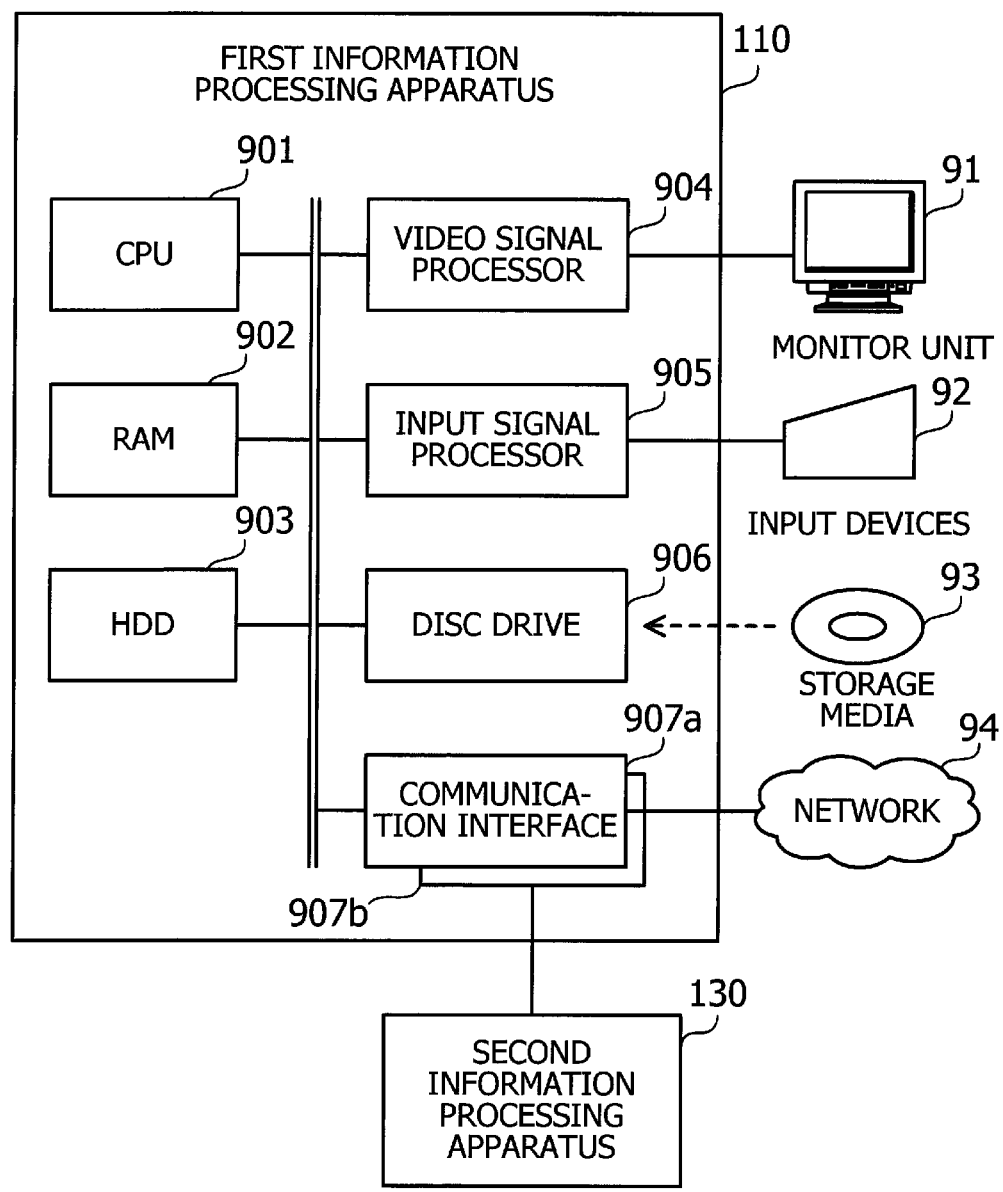
FIG. 3 illustrates an example of a hardware platform for a first information processing apparatus according to a second embodiment.

Referring now to FIG. 3, this section describes an example of a hardware platform for a first information processing apparatus according to the second embodiment. As can be seen in FIG. 3, the illustrated first information processing apparatus 110 includes a central processing unit (CPU) 901, a random access memory (RAM) 902, a hard disk drive (HDD) 903, a video signal processor 904, an input signal processor 905, a disc drive 906, and two communication interfaces 907*a* and 907*b*.

The CPU 901 is a processor having arithmetic and logic units and other computational functions to execute programmed instructions. The CPU 901 loads the RAM 902 with at least part of programs and data read out of the HDD 903 and executes instructions encoded in those programs. The CPU 901 may include a plurality of processor cores. The first information processing apparatus 110 may include two or more such CPUs 901 so as to execute a plurality of processing operations in parallel.

The RAM 902 is a volatile memory device serving as temporary storage for the programs that the CPU 901 executes, as well as for various data that the CPU 109 uses to execute the programs. The first information processing apparatus 110 may have other kinds of memory devices in place of or together with the RAM 902.

The HDD 903 is an example of non-volatile storage devices used to store program files of the operating system (OS), firmware, application software, and the like, together with data files used in processing operations. The first information processing apparatus 110 may have other storage devices such as flash memory and solid state drives (SSD) in place of or in addition to the HDD 903.

The video signal processor 904 produces video signals under the control of the CPU 901 and outputs them to a monitor unit 91 attached to the first information processing apparatus 110. The monitor unit 91 may be, for example, a cathode ray tube (CRT) display, liquid crystal display (LCD), plasma display panel (PDP), organic electro-luminescence display device (OELD), or other display device.

The input signal processor 905 receives input signals from input devices 92 attached to the first information processing apparatus 110 and supplies them to the CPU 901. The input devices 92 may be a mouse, keyboard, touchscreen, touchpad, trackball, remote controller, buttons, or the like.

The disc drive 906 is a device used to read programs and data stored in storage media 93. The storage media 93 include, for example, magnetic disk media such as flexible disk (FD) and HDD, optical disc media such as compact disc (CD) and digital versatile disc (DVD), and magneto-optical storage media such as magneto-optical disc (MO). Under the control of the CPU 901, the disc drive 906 transfers programs and data read out of such storage media 93 to the RAM 902 or HDD 903.

The first information processing apparatus 110 has two communication interfaces 907a and 907b. One communication interface 907 is for communication with other computers via a network 94. The other communication interface 907b is for communication with the second information processing apparatus 130. These communication interfaces 907a and 907b may be a wired interface or a radio interface or a combination of them.

An example of a hardware platform has been discussed above for the proposed first information processing apparatus according to the second embodiment. The foregoing functions of the second information processing apparatus 130, monitored devices 210 and 220, and terminal device 300 may also be implemented with the same hardware configuration discussed above for the first information processing apparatus 110. The communication interface 907b, however, may be eliminated in the monitored devices 210 and 220 and terminal device 300.

(v) Functions of First Information Processing Apparatus

Figure 4:
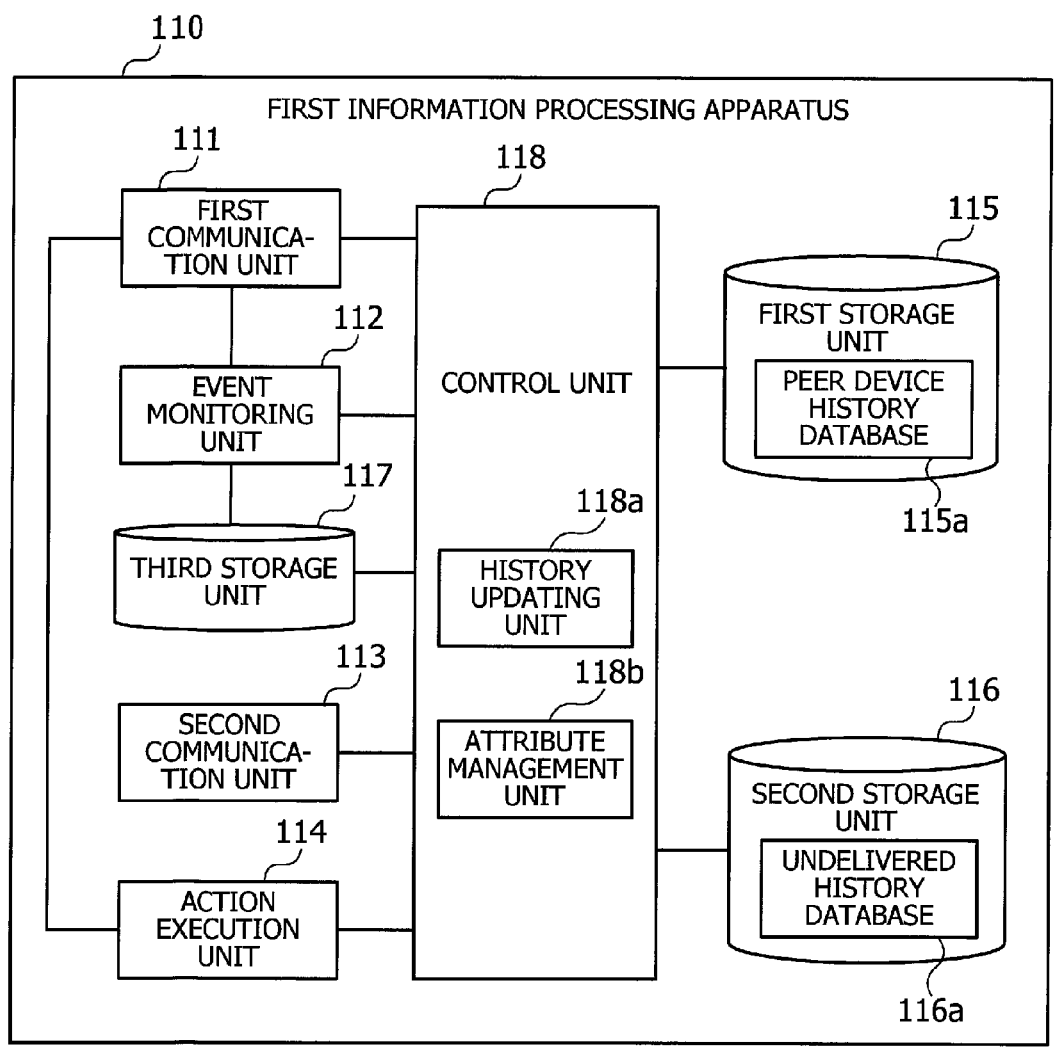
FIG. 4 is a block diagram illustrating functions provided in the first information processing apparatus according to the second embodiment.

Referring now to the block diagram of FIG. 4, this section describes more about the functions provided in the first information processing apparatus according to the second embodiment. As can be seen in FIG. 4, the illustrated first information processing apparatus 110 includes a first communication unit 111, an event monitoring unit 112, a second communication unit 113, an action execution unit 114, a first storage unit 115, a second storage unit 116, a third storage unit 117, and a control unit 118.

The event monitoring unit 112, action execution unit 114, and control unit 118 may be implemented as program modules that the CPU 901 executes. It is also possible to use electronic circuits, rather than software, to implement all or part of these three functional blocks. The first storage unit 115, second storage unit 116, and third storage unit 117 are storage space allocated from the RAM 902 or HDD 903 or both. Functions of the first communication unit 111 may be implemented by using one communication interface 907a described in FIG. 3. Functions of the second communication unit 113 may be implemented by using the other communication interface 907b.

a) First Communication Unit 111

The first communication unit 111 communicates with the monitored devices 210 and 220 and terminal device 300 via a network 94. For example, the first communication unit 111 receives a message transmitted from one monitored device 210 and supplies the received message to the event monitoring unit 112. The first communication unit 111 is also used to send the terminal device 300 a piece of information about execution of an action. For example, the first communication unit 111 is used when sending e-mail data, voice data, and like to the terminal device 300.

b) Event Monitoring Unit 112

The first communication unit 111 supplies received messages to the event monitoring unit 112. Out of these messages, the event monitoring unit 112 extracts particular messages that need execution of actions. What action to execute for what type of events is previously defined as "filtering data," and the event monitoring unit 112 is allowed to consult this filtering data. When a message is supplied from the first communication unit 111, the event monitoring unit 112 extracts information that indicates the type of the message and compares it with each entry of the filtering data. If a match is found, the event monitoring unit 112 extracts the message as having an action to do. The extracted message is then supplied to the control unit 118 for further processing.

c) Second Communication Unit 113

The second communication unit 113 communicates directly with the second information processing apparatus 130. For example, the second communication unit 113 is used to inform the second information processing apparatus 130 of the progress (e.g., start and end of execution) and result (e.g., success or fail) of an action that the first information processing apparatus 110 executes. The first information processing apparatus 110 also uses the second communication unit 113 to send attribute information to the second information processing apparatus 130. This attribute information indicates whether the first information processing apparatus 110 is a primary apparatus or a secondary apparatus. The second communication unit 113 also receives information about the progress and result of actions, as well as attribute information, from the second information processing apparatus 130.

d) Action Execution Unit 114

The action execution unit 114 executes actions under the control of the control unit 118 (described later). In the case of, for example, e-mail notification, the action execution unit 114 commands the first communication unit 111 to send data of an e-mail message to the terminal device 300. In the case of voice notification, the action execution unit 114 commands the first communication unit 111 to send voice data to the terminal device 300. The action execution unit 114 performs other various actions. For example, it executes application programs, issues remote commands, issues SNMP traps, and opens pop-up windows.

e) First Storage Unit 115

The first storage unit 115 accommodates a peer device history database 115a. The peer device history database 115a is a collection of records that indicates execution history of actions executed by the second information processing apparatus 130. These execution history records are referred to herein as "second execution history records." For example, each record of the peer device history database 115a is formed from the following data fields: event timestamp, event ID, source device name, action type, and execution status. The event timestamp field indicates when an action-invoking event occurred. The source device name field indicates at which device the event occurred. The action type indicates what type of action was executed as a result of the event. The execution status field indicates the status of the invoked action. For example, the execution status field indicates whether the action was executed or still is in execution. The execution status field also indicates whether the former action was successfully completed or failed during the execution.

f) Second Storage Unit 116

The second storage unit 116 accommodates an undelivered history database 116a. This undelivered history database 116a stores a subset of execution history records of the actions executed by the action execution unit 114. More particularly, the noted subset is a collection of execution history records that were not received by the second information processing apparatus 130. These records are referred to as "first undelivered history records," whereas the full set of the execution history records is referred to as the "first execution history records." For example, each entry of the undelivered history database 116a is formed from the following data fields: event timestamp, event ID, source device name, action type, and execution status. These data fields describe an event and its corresponding action.

g) Third Storage Unit 117

The third storage unit 117 accommodates attribute data of the first information processing apparatus 110, filtering data, information for identifying monitored devices 210 and 220 and terminal device 300 (e.g., their host names and IP addresses), and application programs. The third storage unit 117 further accommodates a subset of the second execution history records described above. This subset is a collection of records that the second information processing apparatus 130 has kept locally because it was unable to send them to the first information processing apparatus 110. These records are referred to as "second undelivered history records."

h) Control Unit 118

The control unit 118 includes a history updating unit 118a and an attribute management unit 118b. The history updating unit 118a may receive second execution history records from the second information processing apparatus 130 via the second communication unit 113. The history updating unit 118a registers each received record as a new entry of the peer device history database 115a in the first storage unit 115.

The attribute management unit 118b checks the attribute of the first information processing apparatus 110 when a message is delivered from the event monitoring unit 112. The attribute management unit 118b may modify the attribute depending on the state of the first information processing apparatus 110 and second information processing apparatus 130. Further, the attribute management unit 118b enters a first undelivered history record to the undelivered history database 116a in the second storage unit 116 when that record is produced as a result of unsuccessful notification of an action to the second information processing apparatus 130.

As will be described below, the control unit 118 functions differently depending on whether the first information processing apparatus 110 is (1) primary or (2) secondary.

(1) First Information Processing Apparatus as Primary

When the first information processing apparatus 110 is working as the primary apparatus, its control unit 118 functions in the way described below. The behavior of the control unit 118 actually differs in two distinct situations. One situation is (1-1) when the first information processing apparatus 110 is operating properly, and the other is (1-2) when the first information processing apparatus 110 is in the process of recovery from failure. The control unit 118 encounters the latter situation when the first information processing apparatus 110 restarts after it is stopped for some reason. The following description explains how the control unit 118 functions in these two situations.

(1-1) Primary Apparatus in Normal Condition

The attribute management unit 118b receives a message that the event monitoring unit 112 has extracted. The attribute management unit 118b then determines whether the peer device history database 115a contains a record of a message that matches with the received message in their event IDs and source device names. The presence of such a record means that the action associated with the received message has already been executed by the second information processing apparatus 130. The attribute management unit 118b determines whether this is the case.

When the first information processing apparatus 110 is operating properly as the primary apparatus, the control unit 118 finds no such records described above in the peer device history database 115a. Accordingly, the attribute management unit 118b moves forward and causes the action execution unit 114 to execute an action. It is noted here that the secondary apparatus may execute some of the actions that the primary apparatus is supposed to execute, as will be described later as a variation of the embodiments. When this is the case, the peer device history database 115a in the first information processing apparatus 110 contains a record of a message that matches with the received message. More will be discussed in a later section.

With reference to filtering data, the attribute management unit 118b requests the action execution unit 114 to execute an action corresponding to the event type that the message received from the event monitoring unit 112 indicates. At the start of this action by the action execution unit 114, the attribute management unit 118b sends an action start notice to the second information processing apparatus 130 via the second communication unit 113. When the action is finished or aborted, the attribute management unit 118b sends an action end notice to the second information processing apparatus 130 via the second communication unit 113. Besides indicating the end of the action, this notice includes information about whether the action has been executed successfully.

In the case where the second information processing apparatus 130 is unable to receive the above action start notice, the attribute management unit 118b produces a new entry of the undelivered history database 116a to record the event timestamp, source device name, action type, and execution status. This is a first undelivered history record. Suppose, for example, that the second information processing apparatus 130 does not return an acknowledgment (ACK) signal for an action start notice that is transmitted. In this case, the attribute management unit 118b adds a first undelivered history record to the undelivered history database 116a. The attribute management unit 118b further decides not to send an action end notice to the second information processing apparatus 130 even when the action execution unit 114 finishes the action.

During the action, the attribute management unit 118b updates the execution status field of the noted history record in the second storage unit 116. More specifically, the execution status field has an initial value of "In Execution" at the start of the action, and it is held until the execution is finished. When the action ends, the attribute management unit 118b changes the execution status field to "Executed" and adds a piece of information indicating the execution result (e.g., "Success" or "Fail"). In the case of "Fail," the attribute management unit 118b causes the action execution unit 114 to retry the same action.

At the end of one action, the attribute management unit 118b consults the filtering data again to see whether there are more actions to execute for the same event type. If it finds another action associated with the event type, the attribute management unit 118b requests the action execution unit 114 to execute this additional action. The attribute management unit 118b produces another first undelivered history record for the undelivered history database 116a, without sending an action start notice to the second information processing apparatus 130. When the additional action ends, the attribute management unit 118b updates its corresponding execution status in the second storage unit 116, without sending an action end notice to the second information processing apparatus 130.

(1-2) Primary Apparatus in Recovery from Failure

When the first information processing apparatus 110 encounters a failure during its operation as the primary apparatus, the second information processing apparatus 130 takes over the primary role to execute actions. The first information processing apparatus 110 may then recover from failure. The control unit 118 recognizes the recovery by detecting, for example, power-up, startup of the operating system or applications, recovery of network functions, or an explicit indication by the user (in a command from his or her terminal device 300). The control unit 118 then performs the following things.

In the recovery process, the attribute management unit 118b requests the second information processing apparatus 130 via the second communication unit 113 to provide its attribute data and second undelivered history records, if any. The requested information is then received from the second information processing apparatus 130. The attribute management unit 118b stores the received second undelivered history records in the third storage unit 117. The received attribute data, on the other hand, is used to check whether the second information processing apparatus 130 is now working as the primary apparatus or secondary apparatus.

If the received attribute data indicates primary, it means that the second information processing apparatus 130 has changed its attribute from secondary to primary as a result of some event message addressed to the two information processing apparatuses 110 and 130 during the down time (i.e., from failure to restart) of the first information processing apparatus 110. Accordingly the attribute management unit 118b updates the attribute data stored in the third storage unit 117 from primary to secondary to reflect the current role of the first information processing apparatus 110.

If the received attribute data indicates secondary, it means that there have been no event messages received during the down time of the first information processing apparatus 110, and thus the second information processing apparatus 130 keeps its status as the secondary apparatus. Accordingly the attribute management unit 118b simply restarts its operation without changing the attribute.

During its down time (i.e., time from failure to recovery), the first information processing apparatus 110 is unable to receive event messages properly from the monitored device 210. These messages are held in the monitored device 210 as undelivered messages. The monitored device 210 periodically checks whether the first information processing apparatus 110 is operational and, upon detection that it is in recovery from failure, resends the undelivered messages to the first information processing apparatus 110. The attribute management unit 118b receives these messages via the first communication unit 111 and event monitoring unit 112 and performs the following things with each received message. It is noted that the description continues to use the term "undelivered message" although the message has been re-delivered to the first information processing apparatus 110.

An undelivered message contains the event ID and source device name of a particular event. The second undelivered history records stored in the third storage unit 117 may include a record with the same event ID and source device name as the undelivered message. The attribute management unit 118b checks the presence of such a second undelivered history record. In other words, the attribute management unit 118b checks whether the second information processing apparatus 130 has already executed actions for the particular event indicated by the undelivered message.

If there is a match in the second undelivered history records, the attribute management unit 118b decides not to execute actions associated with the event indicated by the undelivered message. If no match is found in the second undelivered history records, then the attribute management unit 118b commands the action execution unit 114 to execute actions associated with the event.

In the case where the monitored device 210 has two or more such undelivered messages, the attribute management unit 118b receives them one by one from the monitored device 210 and checks whether there is a match in the stored second undelivered history records. The attribute management unit 118b then determines whether to execute actions for the undelivered message in the way described above. When this is done for all the undelivered messages, the control unit 118 proceeds to the following operation (2). That is, the control unit 118 in the first information processing apparatus 110 operates as part of the secondary apparatus.

(2) First Information Processing Apparatus as Secondary

When the first information processing apparatus 110 is working as the secondary apparatus, its control unit 118 functions as described below. The behavior of the control unit 118 actually depends on whether the first information processing apparatus 110 is operating properly or in the process of recovery from failure.

(2-1) Secondary Apparatus in Normal Condition

Upon receipt of a message from the event monitoring unit 112, the attribute management unit 118b waits for a specified time, during which the second communication unit 113 is expected to receive an action start notice and an action end notice from the first information processing apparatus 110. When an action start notice is received in this wait time period, the history updating unit 118a adds a first execution history record to the peer device history database 115a, with a value of "In Execution" in its the execution status field. When an action end notice is received, the history updating unit 118a updates the execution status from "In Execution" to "Executed" and adds a result value of either "Success" or "Fail" to the execution status field.

With reference to the peer device history database 115a, the attribute management unit 118b determines whether the action has finished successfully within the wait time period. When this determination confirms successful execution, the attribute management unit 118b finds no need for the first information processing apparatus 110 to execute the action. The above-noted wait time period may previously been defined, or may be updated at appropriate times. Also, the wait time period may vary depending on the type of actions.

When the wait time period expires without indication of successful execution of the action, the attribute management unit 118b commands the action execution unit 114 to execute the action. At the start of the execution, the attribute management unit 118b sends an action start notice to the second information processing apparatus 130 via the second communication unit 113. It also sends an action end notice at the end of the execution. The attribute management unit 118b changes attribute data stored in the third storage unit 117 from secondary to primary to reflect the current role of the first information processing apparatus 110.

The second information processing apparatus 130 may, however, be unable to receive the above action start notice. In this case, the attribute management unit 118b adds a new entry of the undelivered history database 116a to record the event timestamp, source device name, action type, and execution status. This is a first undelivered history record. The attribute management unit 118b further decides not to send an action end notice to the second information processing apparatus 130 even when the action execution unit 114 finishes execution of the action.

During the action, the attribute management unit 118b updates the execution status field of the noted history record in the second storage unit 116. More specifically, the execution status field has an initial value of "In Execution" at the start of the action, and it is held until the execution is finished. When the action ends, the attribute management unit 118b changes the execution status field to "Executed" and adds a piece of information indicating the execution result (e.g., "Success" or "Fail"). In the case of "Fail," the attribute management unit 118b causes the action execution unit 114 to retry the same action.

At the end of one action, the attribute management unit 118b consults the filtering data to see whether there are more actions to execute for the same event type. If it finds another action associated with the event type, the attribute management unit 118b requests the action execution unit 114 to execute this additional action. The attribute management unit 118b produces another first undelivered history record for the undelivered history database 116a, without sending an action start notice to the second information processing apparatus 130. When the additional action ends, the attribute management unit 118b updates its corresponding execution status in the second storage unit 116, without sending an action end notice to the second information processing apparatus 130.

(2-2) Secondary Apparatus in Recovery from Failure

The first information processing apparatus 110 may encounter a failure when it is working as the secondary apparatus, but this failure would not affect the operation of the second information processing apparatus 130. That is, the second information processing apparatus 130 continues to operate as the primary apparatus, without changing its attribute.

When the first information processing apparatus 110 recovers from failure, its attribute management unit 118b requests the second information processing apparatus 130 via the second communication unit 113 to provide second undelivered history records. The requested second undelivered history records then arrive from the second information processing apparatus 130, and the attribute management unit 118b stores them in the third storage unit 117.

During its down time (i.e., time from failure to recovery), the first information processing apparatus 110 is unable to receive messages properly from the monitored device 210. These messages are thus held in the monitored device 210 as undelivered messages. Upon recovery of the first information processing apparatus 110, the attribute management unit 118b receives these messages via the first communication unit 111 and event monitoring unit 112 and performs the following things with each received message.

An undelivered message contains the event ID and source device name of a particular event. The second undelivered history records stored in the third storage unit 117 may include a record with the same event ID and source device name as the undelivered message. The attribute management unit 118b checks the presence of such a second undelivered history record. In other words, the attribute management unit 118b checks whether the second information processing apparatus 130 has already executed actions for the particular event indicated by the undelivered message.

The attribute management unit 118b usually finds a match in the second undelivered history records and thus decides not to execute any actions for the undelivered message. However, when no match is found for the event in question, the attribute management unit 118b commands the action execution unit 114 to execute actions associated with the event.

In the case where the monitored device 210 has two or more such undelivered messages, the attribute management unit 118b receives them one by one from the monitored device 210 and checks whether there is a match in the stored second undelivered history records. The attribute management unit 118b then determines whether to execute actions for the undelivered message in the way described above. When this is done for all the undelivered messages, the control unit 118 proceeds to the operation described above in (2-1). That is, the control unit 118 operates as part of the first information processing apparatus 110 that is in normal condition.

The above section (v) has described various functions provided in the first information processing apparatus 110 according to the second embodiment.

(vi) Functions of Second Information Processing Apparatus

Figure 5:
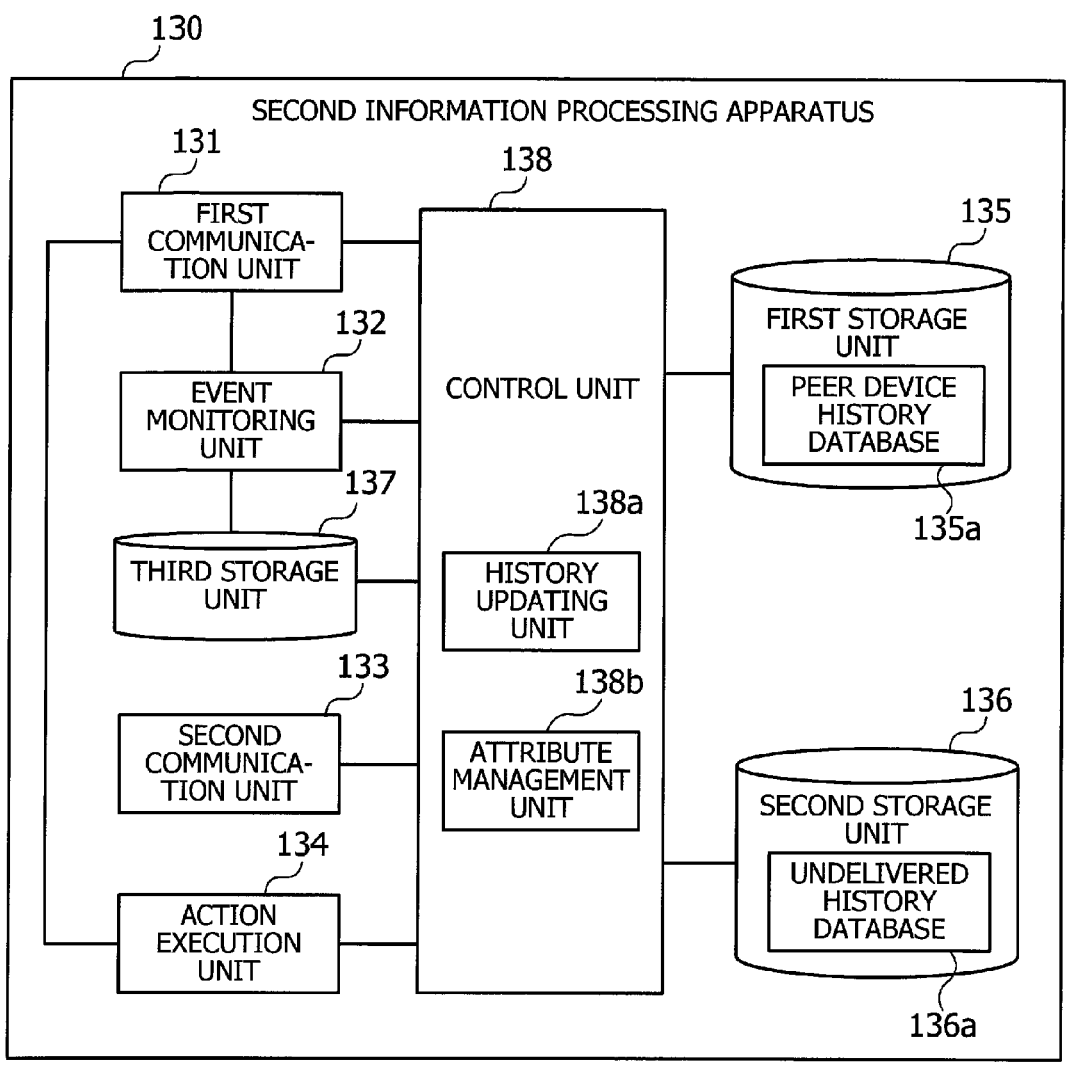
FIG. 5 is a block diagram illustrating functions provided in a second information processing apparatus according to the second embodiment.

Referring to the block diagram of FIG. 5, this section describes the functions provided in a second information processing apparatus according to the second embodiment. As can be seen in FIG. 5, the illustrated second information processing apparatus 130 includes a first communication unit 131, an event monitoring unit 132, a second communication unit 133, an action execution unit 134, a first storage unit 135, a second storage unit 136, a third storage unit 137, and a control unit 138.

The event monitoring unit 132, action execution unit 134, and control unit 138 may be implemented as program modules that the CPU 901 executes. It is also possible to use electronic circuits, rather than software, to implement all or part of these three functional units. The first storage unit 135, second storage unit 136, and third storage unit 137 are storage space allocated from the RAM 902 or HDD 903 or both. Functions of the first communication unit 131 may be implemented by using one communication interface 907a. Functions of the second communication unit 133 may be implemented by using the other communication interface 907b.

The functions of the second information processing apparatus 130 seen in FIG. 5 are similar to their counterparts in the first information processing apparatus 110 discussed in FIG. 4. That is, the foregoing first communication unit 111, event monitoring unit 112, second communication unit 113, and action execution unit 114 correspond to the first communication unit 131, event monitoring unit 132, second communication unit 133, and action execution unit 134, respectively. The foregoing first storage unit 115, second storage unit 116, third storage unit 117, and control unit 118 correspond to the first storage unit 135, second storage unit 136, third storage unit 137, and control unit 138, respectively. See the explanation of FIG. 4 for details of the second information processing apparatus 130.

The above section (vi) has described functions provided in the second information processing apparatus 130 of the second embodiment.

(vii) Functions of Monitored Device

Figure 6:
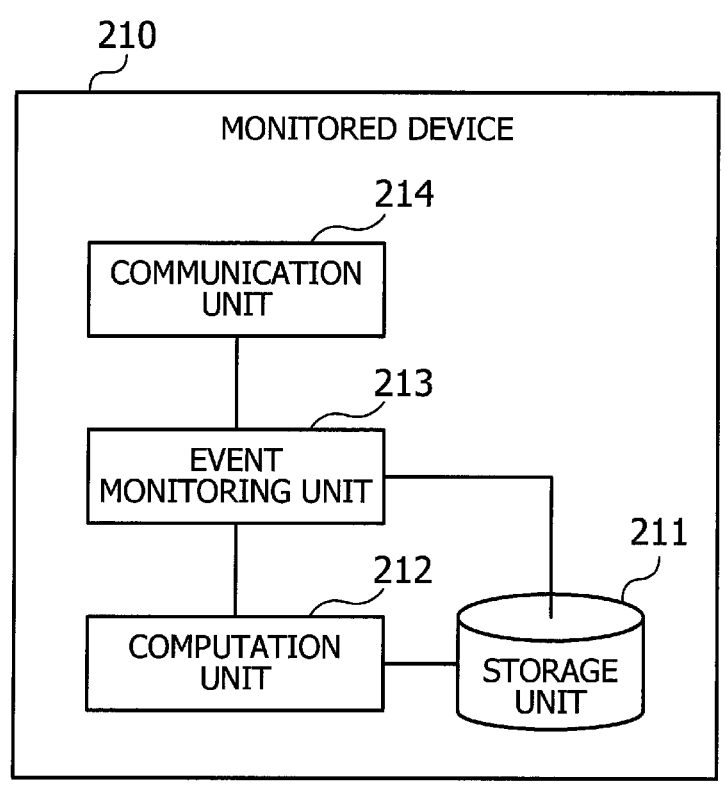
FIG. 6 is a block diagram illustrating functions provided in monitored devices according to the second embodiment.

Referring to the block diagram of FIG. 6, this section describes functions provided in monitored devices according to the second embodiment. While the following description is directed to one monitored device 210, the same description applies to other devices monitored by the information processing system 100, including the aforementioned monitored device 220.

As seen in FIG. 6, the monitored device 210 includes a storage unit 211, a computation unit 212, an event monitoring unit 213, and a communication unit 214. The storage unit 211 is storage space allocated from the RAM 902 or HDD 903 or both. The computation unit 212 and event monitoring unit 213 may be implemented as program modules that the CPU 901 executes. It is also possible to use electronic circuits, rather than software, to implement all or part of these two functional units. Functions of the communication unit 214 may be implemented by using the communication interface 907a.

The storage unit 211 stores various event logs. Also stored are undelivered messages that the first information processing apparatus 110 or second information processing apparatus 130 were unable to receive properly. The storage unit 211 notifies the event monitoring unit 213 of write error in the event that it fails to write some data.

The computation unit 212 executes processing operations related to the operating system and application software. The computation unit 212 also produces and stores various log records in the storage unit 211, which include a system log that records the activities of operating system software, application log that records the activities of application software, and a security log that records log-on results and the like. When an error is encountered during its processing, the computation unit 212 notifies the event monitoring unit 213 of the error.

The communication unit 214 permits the computation unit 212 to communicate with other devices on the network 94. For example, the communication unit 214 may send messages to the first information processing apparatus 110 and second information processing apparatus 130 via the network 94. Otherwise, the communication unit 214 notifies the event monitoring unit 213 of errors when the network connection is disrupted, or an excessive amount of packets are lost.

The event monitoring unit 213 watches error and other events that may be detected in the storage unit 211, computation unit 212, and communication unit 214. Upon occurrence of an event, the event monitoring unit 213 sends a message to the first information processing apparatus 110 and second information processing apparatus 130. This message conveys an event timestamp and an event ID to indicate what kind of event happened at what time. The event monitoring unit 213 may be configured to read event log records out of the storage unit 211 and send them to the first information processing apparatus 110 and second information processing apparatus 130 at certain time intervals.

The first information processing apparatus 110 and second information processing apparatus 130 may be unable to receive those messages properly. The event monitoring unit 213 detects this as a lack of ACK from them and thus records the undelivered message in the storage unit 211. This record includes information that indicates which of the first information processing apparatus 110 and second information processing apparatus 130 has failed to receive the message in question.

When either the first information processing apparatus 110 or second information processing apparatus 130 is down, the event monitoring unit 213 monitors their recovery process. Upon detection of recovery of the once-failed apparatus, the event monitoring unit 213 transfers undelivered messages from the storage unit 211 to the recovered apparatus.

The above section (vii) has described functions of monitored devices according to the second embodiment.

(viii) Operation of Apparatuses and Content of Database

This section provides more specifics about operation of the first information processing apparatus 110 and second information processing apparatus 130, as well as discussing the content of databases stored in them. Note that the description will use the terms "abnormal," "in recovery," and "normal" to mean the following states of each of these two information processing apparatuses 110 and 130. An apparatus is said to be "abnormal" when it is experiencing a failure, "in recovery" when it has just made its way out of the failure, and "normal" when it is working without failure or has finished its recovery process.

a) Both Primary and Secondary are Normal

Figure 7:
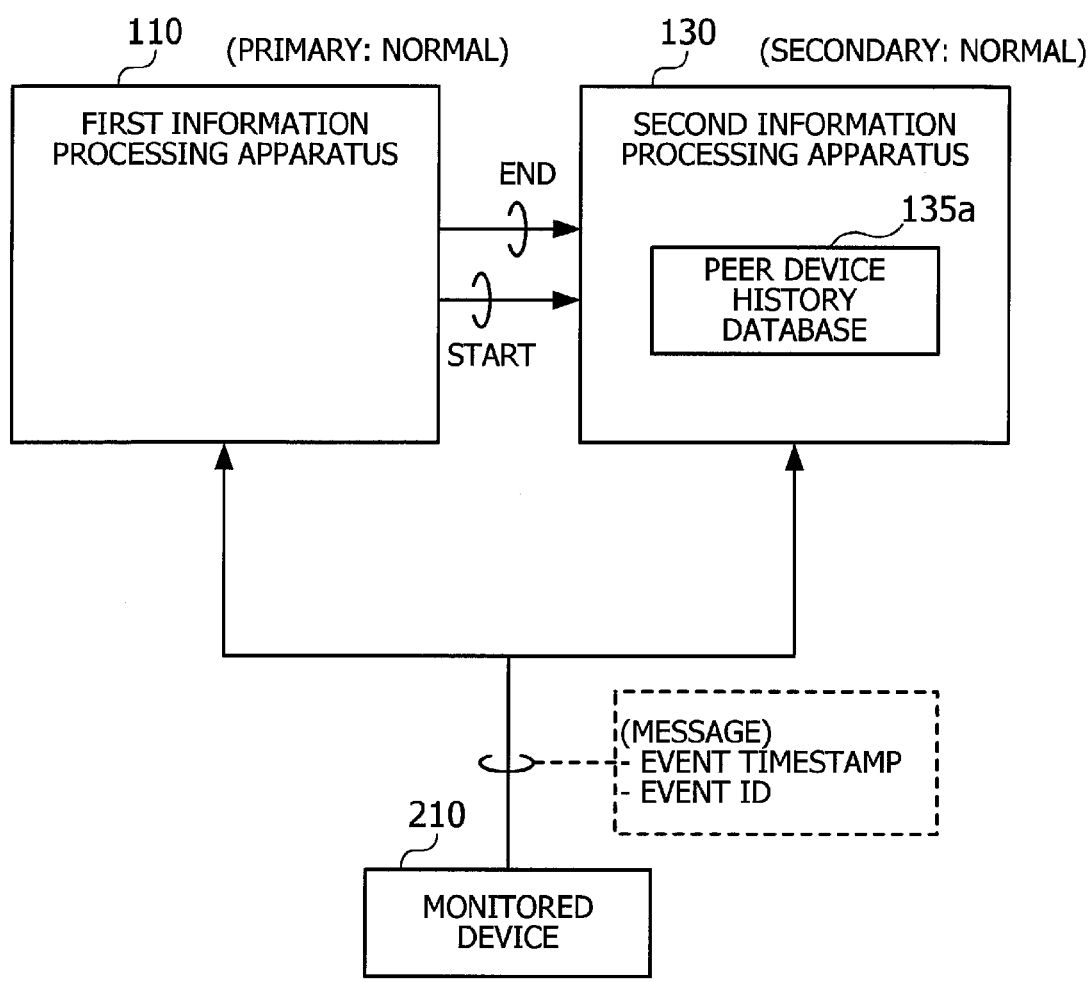
FIG. 7 is a first diagram explaining operation of the first and second information processing apparatuses according to the second embodiment.

FIG. 7 is a first diagram explaining operation of the first and second information processing apparatuses according to the second embodiment. The example seen in FIG. 7 represents the following situation: The first information processing apparatus 110 is working as the primary apparatus, while the second information processing apparatus 130 as the secondary apparatus. Both the primary and secondary apparatuses are in normal condition.

A message is transmitted from one monitored device 210 as seen in FIG. 7 to notify the first information processing apparatus 110 and second information processing apparatus 130 of an event in the monitored device 210. In response, the first information processing apparatus 110 (primary) executes an action associated with the event indicated by the received message. On the other hand, the second information processing apparatus 130 (secondary) waits for a specified time after the message reception.

At the start of the execution, the first information processing apparatus 110 sends an action start notice to the second information processing apparatus 130. Upon receipt of this notice, the second information processing apparatus 130 produces and stores a first execution history record in its peer device history database 135a, giving a value of "In Execution" to the execution status field of the record. The second information processing apparatus 130 continues to wait until the action is completed.

At the end of the execution, the first information processing apparatus 110 sends the second information processing apparatus 130 an action end notice including execution result information (Success or Fail). This action end notice causes the second information processing apparatus 130 to change the execution status in the peer device history database 135a from "In Execution" to "Executed" and add the received execution result information (Success or Fail) to the execution status field. When the action fails during its execution, the first information processing apparatus 110 retries the action. When the action is successful, the consequent action end notice prevents the second information processing apparatus 130 from executing the action.

Each time a message arrives from the monitored device 210, the two information processing apparatuses 110 and 130 repeat the above sequence. As a result, a number of records are accumulated in the first storage unit 135 of the second information processing apparatus 130, as seen in FIG. 8.

FIG. 8 illustrates an example of the peer device history database 135a according to the second embodiment. The peer device history database 115a and undelivered history databases 116a and 136a store similar information. The illustrated peer device history database 135a contains a plurality of records each composed of the following data fields: event timestamp, event ID, source device name, action type, and execution status. The source device name field in this example contains the name "host1" of the monitored device 210. The execution status field contains "Executed (Success)" to indicate completion of the action, or "Executed (Failed)" to indicate abnormal end of the action, or "In execution" to indicate that the action is being executed.

b) Primary is Abnormal while Secondary is Normal

Figure 9:
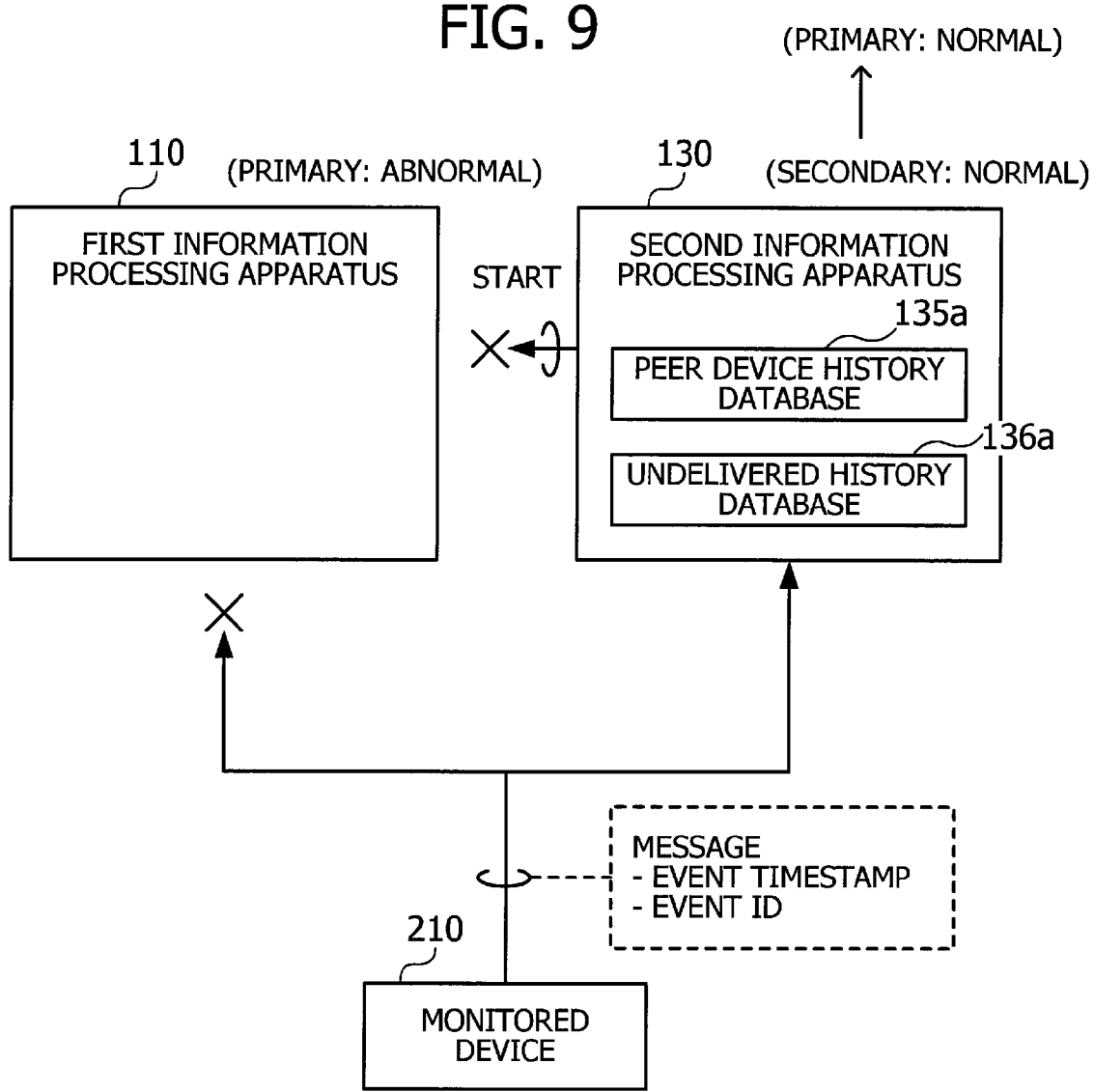
FIG. 9 is a second diagram explaining operation of the first and second information processing apparatuses according to the second embodiment.

FIG. 9 is a second diagram explaining operation of the first and second information processing apparatuses according to the second embodiment. The example seen in FIG. 9 represents the following situation: The first information processing apparatus 110 has been primary, but is now in abnormal condition. The second information processing apparatus 130 is working properly as the secondary apparatus.

In the situation seen in FIG. 9, the first information processing apparatus 110 (primary) is unable to receive messages from the monitored device 210, let alone execute actions for them. On the other hand, the second information processing apparatus 130 (secondary) receives a message from the monitored device 210 and thus waits for a specified time. This wait time, however, expires with no action end notice received from the first information processing apparatus 110. There is even no action start notice in the example of FIG. 9. Upon expiration of the wait time, the second information processing apparatus 130 thus decides to execute actions associated with the event indicated by the received message, changing its own attribute from secondary to primary.

The second information processing apparatus 130 first consults the peer device history database 135a to determine whether there is a record indicating that the first information processing apparatus 110 successfully executed actions corresponding to the same event. When no such first execution history record is found in the peer device history database 135a, the second information processing apparatus 130 starts to execute actions, sending an action start notice to the first information processing apparatus 110. In the illustrated situation of FIG. 9, however, the first information processing apparatus 110 does not receive this action start notice. The second information processing apparatus 130 therefore enters a second undelivered history record in the undelivered history database 136a, giving a value of "In Execution" to the execution status field of the record.

When the action ends, the second information processing apparatus 130 changes the execution status in the undelivered history database 136a from "In Execution" to "Executed" and adds a piece of information indicating the execution result (Success or Fail). The second information processing apparatus 130 in this situation does not send an action end notice to the first information processing apparatus 110. When the action fails during its execution, the second information processing apparatus 130 retries the action, besides entering again a second undelivered history record to the undelivered history database 136a.

c) Ex-Primary is in Recovery while Primary is Normal

Figure 10:
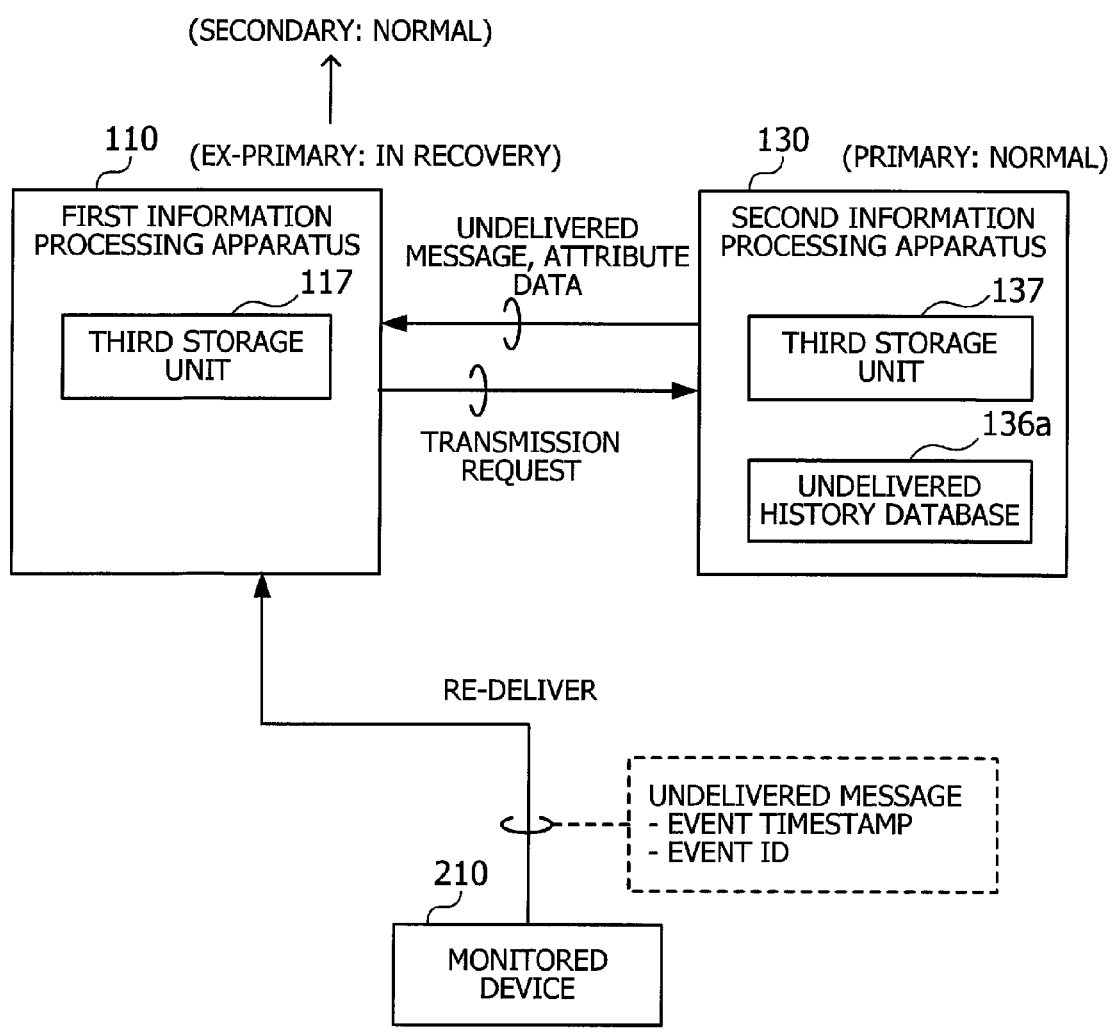
FIG. 10 is a third diagram explaining operation of the first and second information processing apparatuses according to the second embodiment.

FIG. 10 is a third diagram explaining operation of the first and second information processing apparatuses according to the second embodiment. FIG. 10 actually exemplifies a sequel of the situation discussed above in FIG. 9. That is, the first information processing apparatus 110 exits from abnormal condition and is now in the process of recovery. Because the second information processing apparatus 130 has changed its attribute from secondary to primary as discussed in FIG. 9, both the first information processing apparatus 110 and second information processing apparatus 130 claim to be primary. To distinguish these two primary apparatuses, the following description uses "ex-primary" to refer to the first information processing apparatus 110 in the recovery process.

In the course of its recovery process, the first information processing apparatus 110 requests the second information processing apparatus 130 to send second undelivered history records and attribute data. In response, the second information processing apparatus 130 retrieves second undelivered history records from its undelivered history database 136a, as well as attribute data from its third storage unit 137, and transmits them to the first information processing apparatus 110. The first information processing apparatus 110 stores the received second undelivered history records in its third storage unit 117. The received attribute data indicates that the second information processing apparatus 130 is working as the primary apparatus. Accordingly the first information processing apparatus 110 changes its own attribute from primary to secondary.

The first information processing apparatus 110 further requests the monitored device 210 to send undelivered messages, if any. In response, the monitored device 210 transmits an undelivered message to the first information processing apparatus 110. Upon receipt, the first information processing apparatus 110 compares the received message with second undelivered history records stored in the third storage unit 117, thereby determining whether the second information processing apparatus 130 has successfully executed an action associated with an event indicated by the received message.

When there is a second undelivered history record that indicates successful execution of the action by the second information processing apparatus 130, the first information processing apparatus 110 finds no need for executing the same action. When no such second undelivered history records are found, the first information processing apparatus 110 executes actions associated with the event indicated by the received undelivered message. The first information processing apparatus 110 also does the same when the found second undelivered history record indicates failed execution of the action.

In the case where a plurality of undelivered messages are received from the monitored device 210, the first information processing apparatus 110 repeats the above processing (i.e., execution of actions when needed) for each received message. When all the received messages are done, the first information processing apparatus 110 begins to operate as the secondary apparatus while permitting the second information processing apparatus 130 to continue to be the primary apparatus. In other words, the first information processing apparatus 110 and second information processing apparatus 130 now work together in a normal way as in FIG. 7, but with the swapped roles of primary and secondary.

d) Primary is Normal while Secondary is Abnormal

Figure 11:
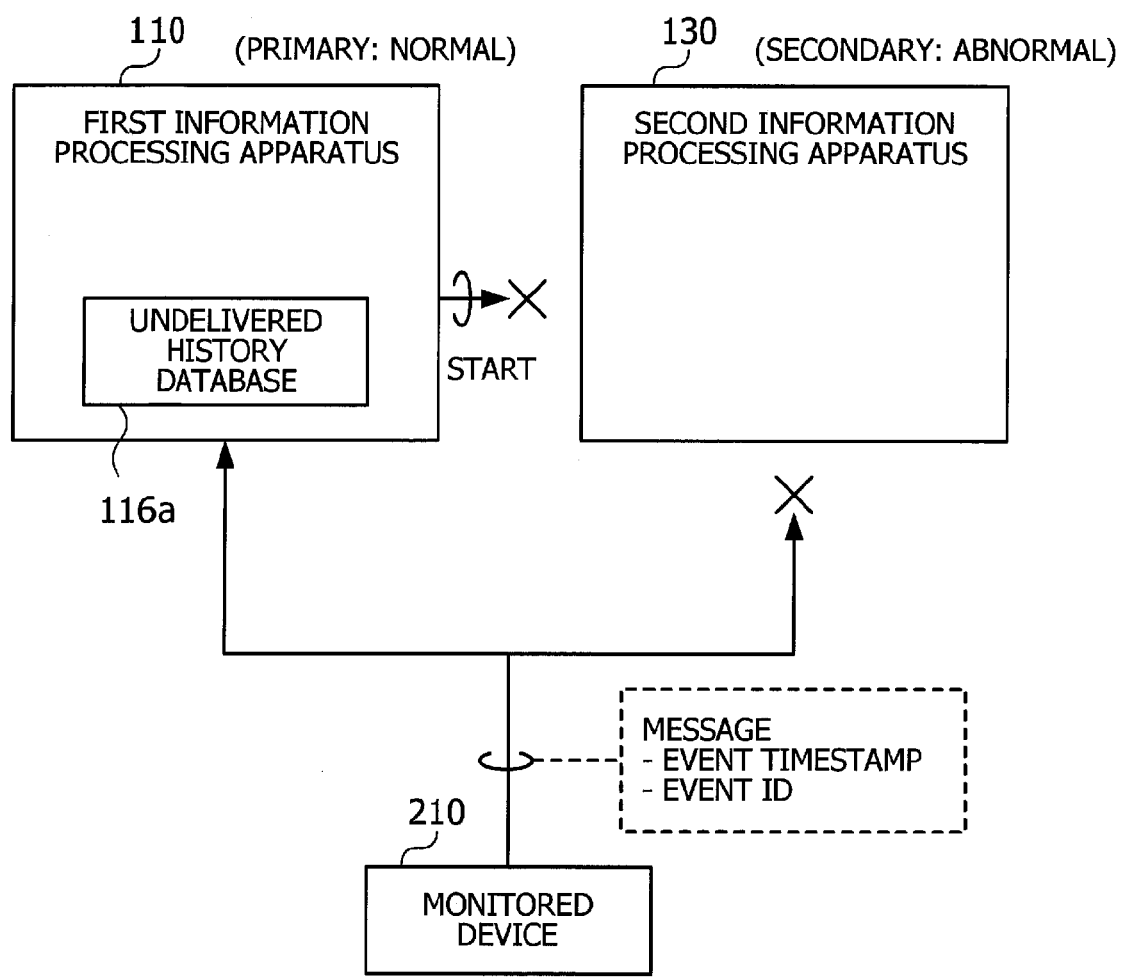
FIG. 11 is a fourth diagram explaining operation of the first and second information processing apparatuses according to the second embodiment.

FIG. 11 is a fourth diagram explaining operation of the first and second information processing apparatuses according to the second embodiment. The example seen in FIG. 11 represents the following situation: The first information processing apparatus 110 is working properly as the primary apparatus. The second information processing apparatus 130 has been secondary, but is now in abnormal condition.

Under the above-noted situation of FIG. 11, a message is sent from the monitored device 210 to the first information processing apparatus 110 and second information processing apparatus 130. The first information processing apparatus 110 (primary) in normal condition receives this message correctly and thus executes an action associated with the event indicated by the received message. At the start of the execution, the first information processing apparatus 110 sends an action start notice to the second information processing apparatus 130. The second information processing apparatus 130, however, does not receive this notice properly.

Accordingly, the first information processing apparatus 110 enters a first undelivered history record to its undelivered history database 116a, giving a value of "In Execution" to the execution status field of the record. When the action ends, the first information processing apparatus 110 changes the execution status in the undelivered history database 116a from "In Execution" to "Executed" and adds a piece of information indicating the execution result (Success or Fail). The first information processing apparatus 110 in this situation does not send an action end notice to the second information processing apparatus 130. When the action fails during its execution, the first information processing apparatus 110 retries the action, besides entering again a first undelivered history record to the undelivered history database 116a.

e) Primary is Normal while Secondary is in Recovery

Figure 12:
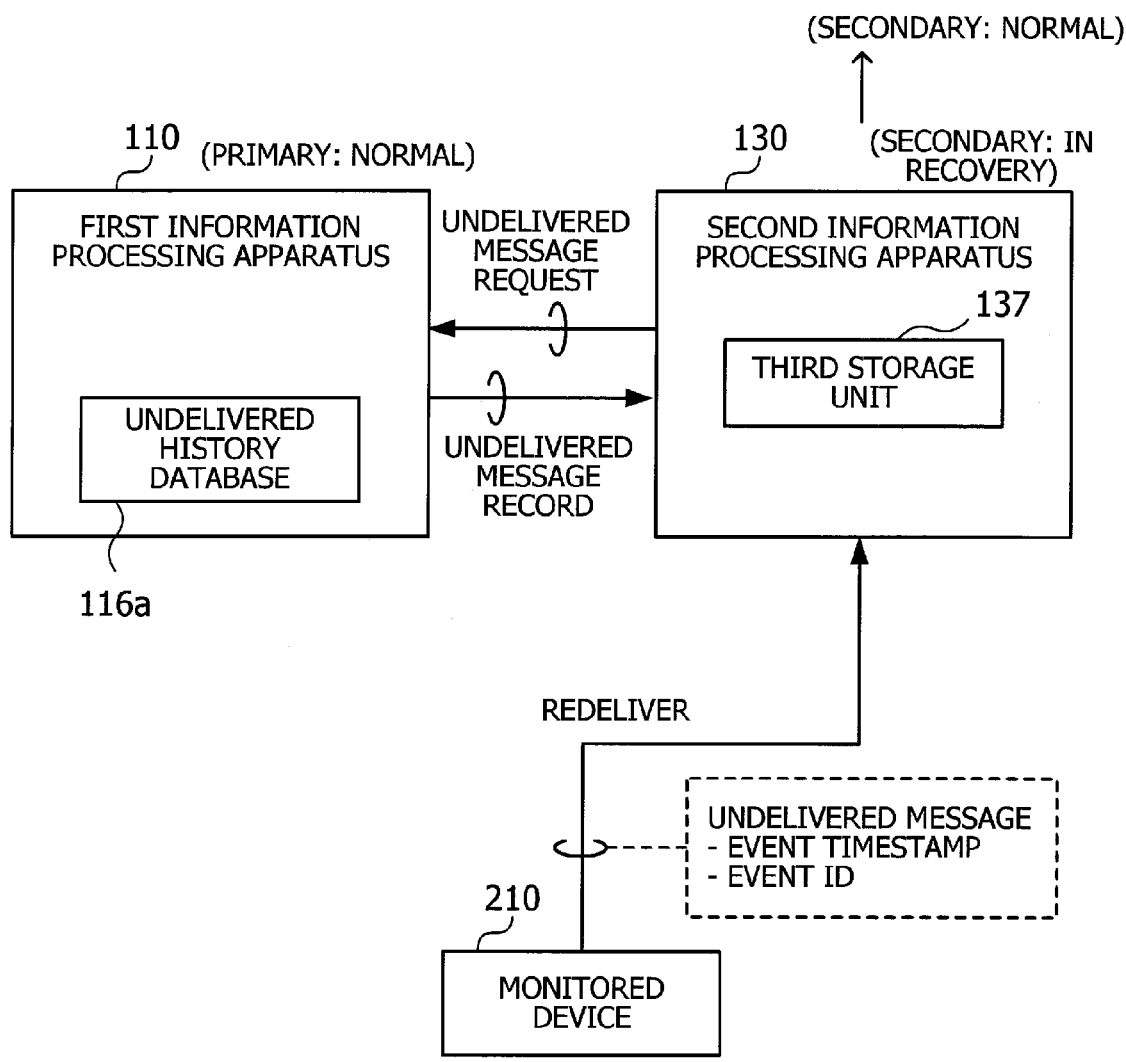
FIG. 12 is a fifth diagram explaining operation of the first and second information processing apparatuses according to the second embodiment.

FIG. 12 is a fifth diagram explaining operation of the first and second information processing apparatuses according to the second embodiment. FIG. 12 exemplifies a sequel of the situation discussed above in FIG. 11. That is, the second information processing apparatus 130 exits from abnormal condition and is now in the process of recovery.

In the course of its recovery process, the second information processing apparatus 130 requests the first information processing apparatus 110 to send first undelivered history records. In response, the first information processing apparatus 110 retrieves first undelivered history records from its undelivered history database 116a and transmits them to the second information processing apparatus 130.

The second information processing apparatus 130 stores the received first undelivered history records in its third storage unit 137.

The second information processing apparatus 130 further requests the monitored device 210 to send undelivered messages, if any. In response, the monitored device 210 transmits an undelivered message to the second information processing apparatus 130. Upon receipt, the second information processing apparatus 130 compares the received message with first undelivered history records stored in the third storage unit 137, thereby determining whether the first information processing apparatus 110 has successfully executed an action associated with an event indicated by the received message. When there is a first undelivered history record that indicates successful execution of the action by the first information processing apparatus 110, the second information processing apparatus 130 finds no need for executing the same action. When it is found that the first information processing apparatus 110 has failed to execute some actions, the second information processing apparatus 130 executes them.

In the case where a plurality of undelivered messages are received from the monitored device 210, the second information processing apparatus 130 repeats the above processing for each received message. When all the received messages are done, the second information processing apparatus 130 resumes its normal operation as the secondary apparatus, while the first information processing apparatus 110 keeps working as the primary apparatus. In other words, the first information processing apparatus 110 and second information processing apparatus 130 go back to their normal operation discussed previously in FIG. 7.

The first information processing apparatus 110 and second information processing apparatus 130 operate in the way described above. Also discussed above is what these two apparatuses contain in their respective databases.

(ix) Update of Peer Device History Database

Figure 13:
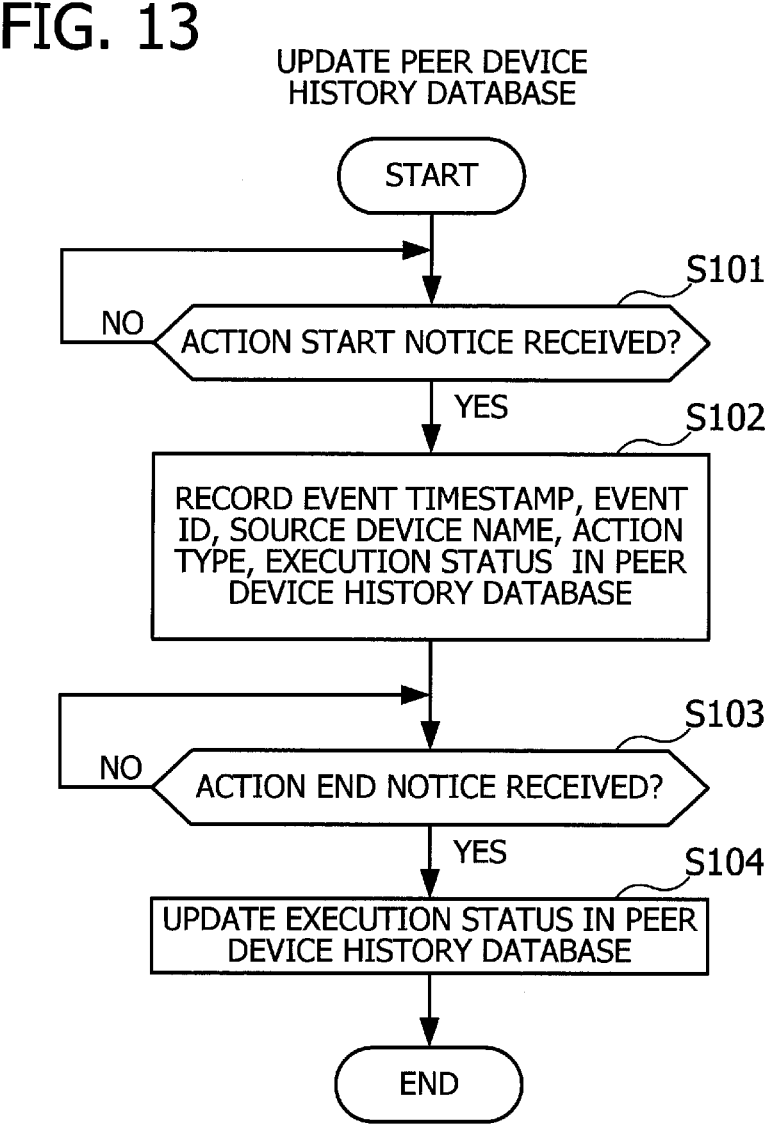
FIG. 13 is a flowchart describing how a peer device history database is updated in the second embodiment.

Referring now to the flowchart of FIG. 13, this section describes how a peer device history database is updated in the second embodiment. It is assumed, for example, that the first information processing apparatus 110 is primary while the second information processing apparatus 130 is secondary. The following explanation focuses on how the control unit 138 (particularly, history updating unit 138a) updates the peer device history database 135a in the second information processing apparatus 130. The same flowchart of FIG. 13 similarly applies to the way the control unit 118 (particularly, history updating unit 118a) updates the peer device history database 115a in the first information processing apparatus 110.

(S101) The history updating unit 138a waits for an action start notice that the first information processing apparatus 110 is supposed to send at the start of execution of an action. Upon receipt of an action start notice, the history updating unit 138a proceeds to S102.

(S102) The history updating unit 138a populates the peer device history database 135a with a first execution history record composed of event timestamp, event ID, source device name, action type, and execution status. At this point, the history updating unit 138a gives a value of "In Execution" to the execution status field of the record. Event timestamp and event ID are extracted from the received message. Source device name (or host name) is obtained from, for example, the source IP address of the received message. Action type is obtained from filtering data stored in the third storage unit 137.

(S103) The history updating unit 138a waits for an action end notice that the first information processing apparatus 110 is supposed to send at the end of execution of an action. Upon receipt of such an action end notice, the history updating unit 138a proceeds to S104. The received action end notice contains execution result information (Success or Fail) of the action.

(S104) The history updating unit 138a updates the above-noted first execution history record in the peer device history database 135a with a new value of "Executed" for the execution status field. The history updating unit 138a further adds the received execution result information to the same execution status field. The end of this S104 means the end of update processing on the peer device history database 135a for a single round of execution of a single action.

The above process updates a peer device history database according to the second embodiment.

(x) Recovery Process

Figure 14:
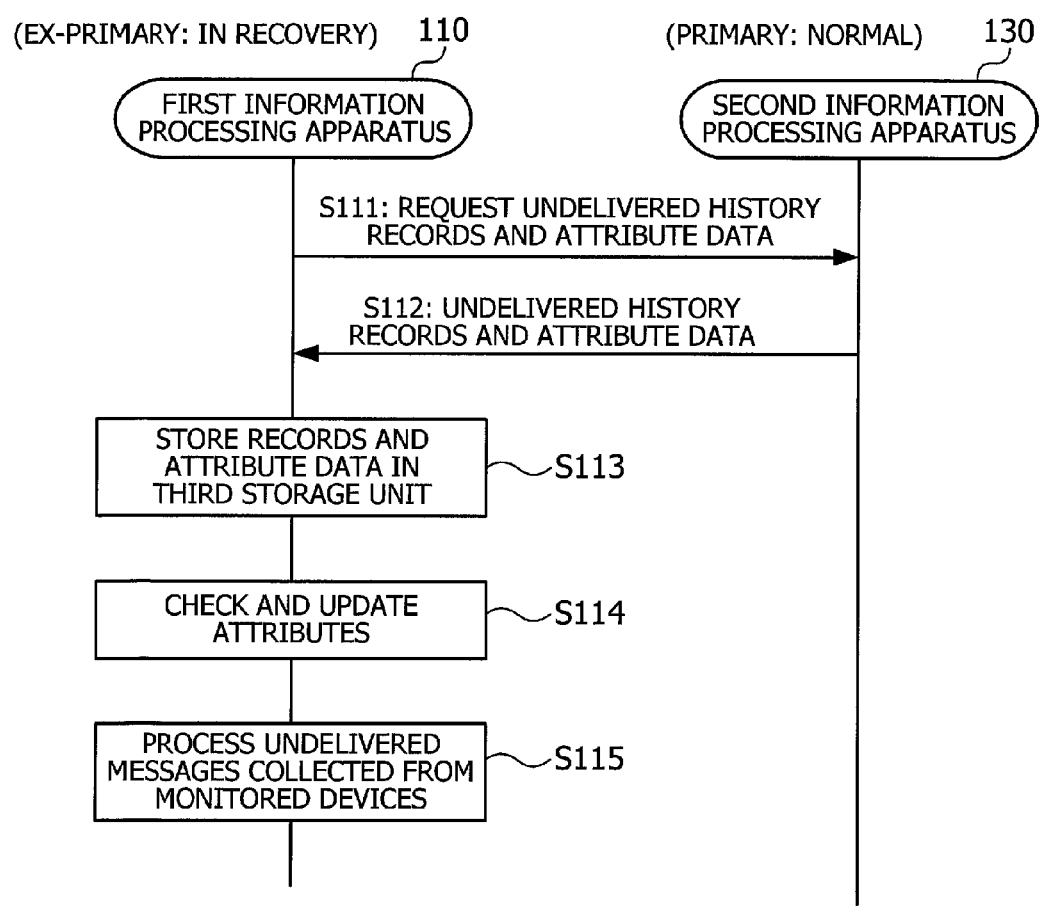
FIG. 14 is a sequence diagram explaining how primary and secondary apparatuses recover their normal activities according to the second embodiment.

Referring now to the sequence diagram of FIG. 14, this section describes how the primary and secondary information processing apparatuses regain their normal operation in the second embodiment. The illustrated sequence diagram assumes, for example, that the first information processing apparatus 110 has stopped due to some failure during its operation as the primary apparatus and is now in the process of recovery from the failure. It also assumes that the second information processing apparatus 130 has changed itself from secondary to primary during the down time of the first information processing apparatus 110.

(S111) In the recovery process of the first information processing apparatus 110, its attribute management unit 118b requests the second information processing apparatus 130 to send second undelivered history records and attribute data. Here the attribute management unit 118b recognizes the beginning of a recovery process by detecting, for example, power-up, startup of the operating system or applications, recovery of network functions, or an explicit indication by the user (in a command from his or her terminal device 300).

(S112) In response to the above request, the attribute management unit 138b retrieves second undelivered history records from the undelivered history database 136a, as well as attribute data from the third storage unit 137, and transmits them to the first information processing apparatus 110.

(S113) The attribute management unit 118b receives the second undelivered history records and attribute data from the second information processing apparatus 130 and stores them in the third storage unit 117.

(S114) With reference to the attribute data stored in the third storage unit 117, the attribute management unit 118b checks whether the second information processing apparatus 130 is primary or secondary. When the second information processing apparatus 130 is found to be primary, the attribute management unit 118b changes the attribute of the first information processing apparatus 110 to secondary.

(S115) The attribute management unit 118b collects undelivered messages from monitored devices 210 and 220. With reference to second undelivered history records stored in the third storage unit 117, the control unit 118 determines whether the second information processing apparatus 130 has successfully executed actions associated with each event indicated by the collected messages.

The attribute management unit 118b does not execute the same actions when it is found that second information processing apparatus 130 has successfully executed them. When a failed action or a missing action is found, the attribute management unit 118b executes such actions. Upon completion of processing for all the collected messages, the first information processing apparatus 110 begins to operate as the secondary apparatus. The second information processing apparatus 130 continues to be primary.

The above-described sequence enables the primary information processing apparatus of the second embodiment to return to its normal operation. The secondary information processing apparatus would also operate in the same way when it fell in an abnormal condition. It is noted that, while the above sequence includes some operations on the attribute of apparatuses and the attribute data indicating the same, the secondary information processing apparatus may omit those operations in its recovery process.

(xi) Operation of Primary Apparatus

Figure 15:
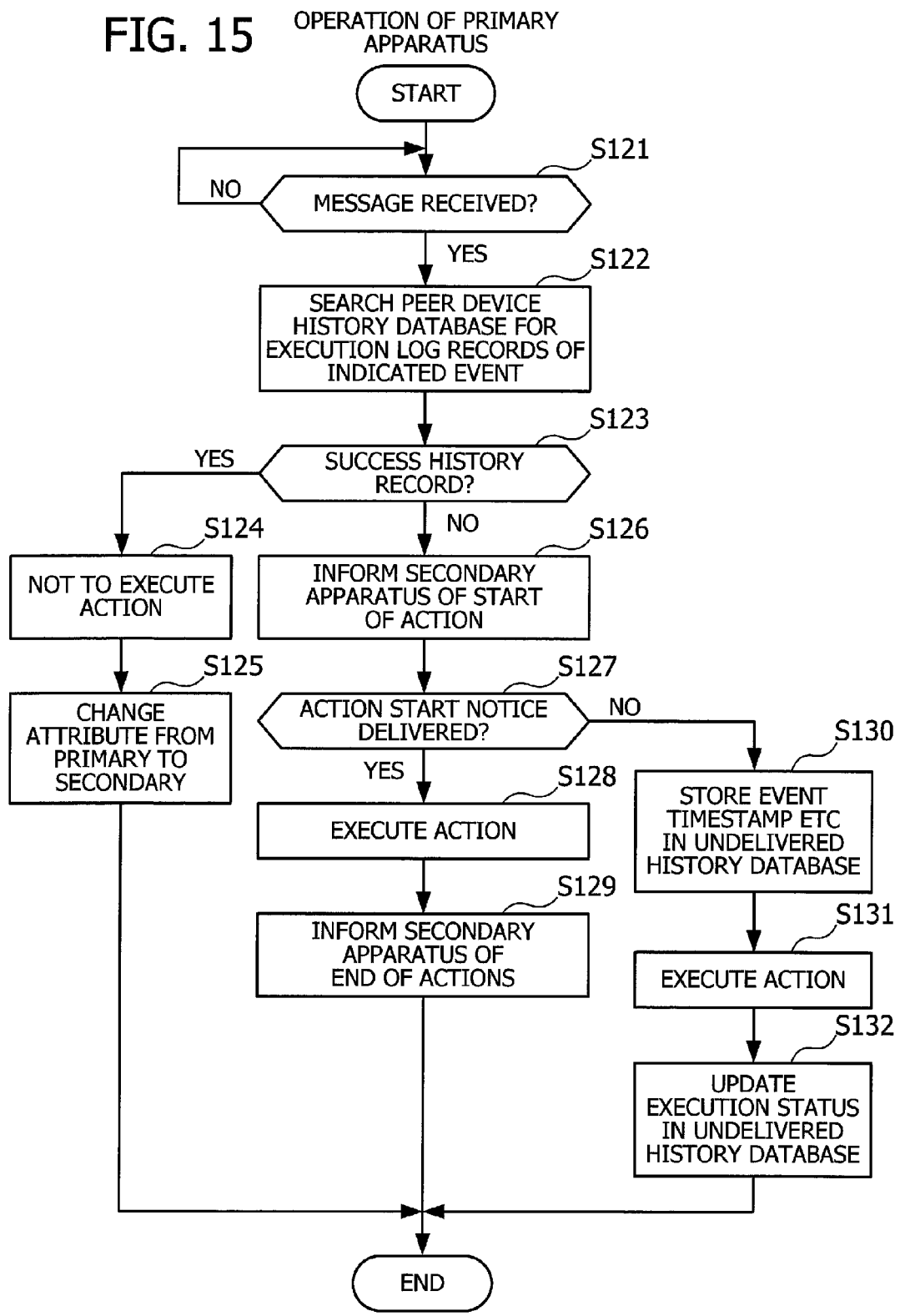
FIG. 15 is a flowchart describing operation of a primary apparatus according to the second embodiment.

Referring now to the flowchart of FIG. 15, this section describes how the primary apparatus operates according to the second embodiment. It is assumed, for example, that the first information processing apparatus 110 is primary while the second information processing apparatus 130 is secondary. The following explanation focuses on the first information processing apparatus 110, but the same explanation similarly applies to the second information processing apparatus 130 when it works as the primary apparatus.

(S121) The attribute management unit 118b determines whether a message is received from monitored devices 210 and 220. The attribute management unit 118b proceeds to S122 when a message is received. Otherwise, the attribute management unit 118b repeats this S121.

(S122) The attribute management unit 118b searches the peer device history database 115a for a second execution history record that matches with the event indicated by the message received at S121. The peer device history database 115a may, however, contain records that indicate failed execution of actions. The attribute management unit 118b rejects such records and thus extracts a set of second execution history records indicating successful execution of actions associated with the event of interest. The extracted records are referred to herein as "success log record."

It is noted that the peer device history database 115a is constantly updated by the history updating unit 118a in the way described in FIG. 13 each time the first information processing apparatus 110 receives an action start notice or action end notice from the second information processing apparatus 130. The attribute management unit 118b can therefore check whether the second information processing apparatus 130 has successfully executed an action for the event in question before the first information processing apparatus 110 starts execution of the same.

(S123) The attribute management unit 118b proceeds to S124 when a success log record is extracted from the peer device history database 115a at S122. That is, S124 is taken when it is found that the second information processing apparatus 130 has successfully executed an action associated with the event indicated by the received message.

The attribute management unit 118b, on the other hand, proceeds to S126 when no success log record is extracted from the peer device history database 115a at S122. That is, S126 is taken when the second information processing apparatus 130 has failed to complete the action associated with the event indicated by the received message or has not executed such actions at all.

The first information processing apparatus 110 is supposed to execute actions for an event indicated by a message, as long as it is operating properly (without stopping) as the primary apparatus. This means that the peer device history database 115a normally has no success log records for those actions. However, the second information processing apparatus 130 may happen to execute actions for some reason, e.g., when a message arrives at the first information processing apparatus 110 excessively later than its counterpart of the second information processing apparatus 130. In such cases, the peer device history database 115a contains success log records for the actions executed by the second information processing apparatus 130.

(S124) The attribute management unit 118b decides not to execute actions for the event indicated by the message received at S121. In other words, the attribute management unit 118b restrains the first information processing apparatus 110 from executing actions for that event.

(S125) The attribute management unit 118b changes the attribute data stored in the third storage unit 117 from primary to secondary, so that the first information processing apparatus 110 operates as the secondary apparatus. That is, the presence of success log records in the peer device history database 115a means that the second information processing apparatus 130 is working as the primary apparatus, thus causing the first information processing apparatus 110 to become secondary. Completion of this S125 marks the end of an action associated with a single message.

(S126) The attribute management unit 118b starts execution of an action, sending an action start notice to the second information processing apparatus 130.

(S127) The attribute management unit 118b determines whether the action start notice has been delivered to the second information processing apparatus 130 properly. This determination may be made by, for example, checking whether the second information processing apparatus 130 acknowledges receipt of the action start notice.

When it is confirmed that the second information processing apparatus 130 has correctly received the action start notice, the attribute management unit 118b regards it as indicating that the second information processing apparatus 130 is operating properly. The attribute management unit 118b thus advances to S128. Otherwise, the attribute management unit 118b recognizes that the second information processing apparatus 130 is in some trouble, thus proceeding to S130.

(S128) The action execution unit 114 executes the action for the event indicated by the received message. Suppose, for example, that the event type of interest is associated with an action of e-mail notification. The action execution unit 114 sends the terminal device 300 an e-mail message that indicates occurrence of an event, as well as providing some details of the event. When this e-mail message reaches the terminal device 300, the attribute management unit 118b regards it as successful execution of the action. When it fails to send the e-mail message to the terminal device 300, the attribute management unit 118b takes it as failed execution of the action. In either case, the attribute management unit 118b proceeds to S129.

(S129) The attribute management unit 118b sends an action end notice to the second information processing apparatus 130 to indicate that the action has successfully finished, or that the action has failed during its execution. In the latter case, the attribute management unit 118b may retry the same actions by repeating the above procedure, i.e., sending an action start notice, executing the action, and sending an action end notice. Completion of this S129 marks the end of an action associated with a single message.

(S130) The attribute management unit 118b stores a first undelivered history record in the undelivered history database 116a to record the event timestamp, execution status, and other information about the event. Here the attribute management unit 118b sets a value of "In Execution" to the execution status.

(S131) The action execution unit 114 executes an action for the event indicated by the received message. For example, the action execution unit 114 sends the terminal device 300 an e-mail message that indicates occurrence of an event, as well as providing some details of the event. When this e-mail message reaches the terminal device 300, the attribute management unit 118b regards it as successful execution of the action. When it fails to send the e-mail message to the terminal device 300, the attribute management unit 118b takes it as failed execution of the action. As the action has ended, the attribute management unit 118b proceeds to S132.

(S132) The attribute management unit 118b updates the aforementioned first undelivered history record in the undelivered history database 116a by changing its execution status field to "Executed." The attribute management unit 118b also adds execution result information to the same field. In the case where the action has failed, the attribute management unit 118b repeats the procedure of S130 to S132 to retry the same action. Completion of this S132 marks the end of an action associated with a single message.

The above section (xi) has described how the primary apparatus operates according to the second embodiment.

(xii) Operation of Secondary Apparatus

Figure 16:
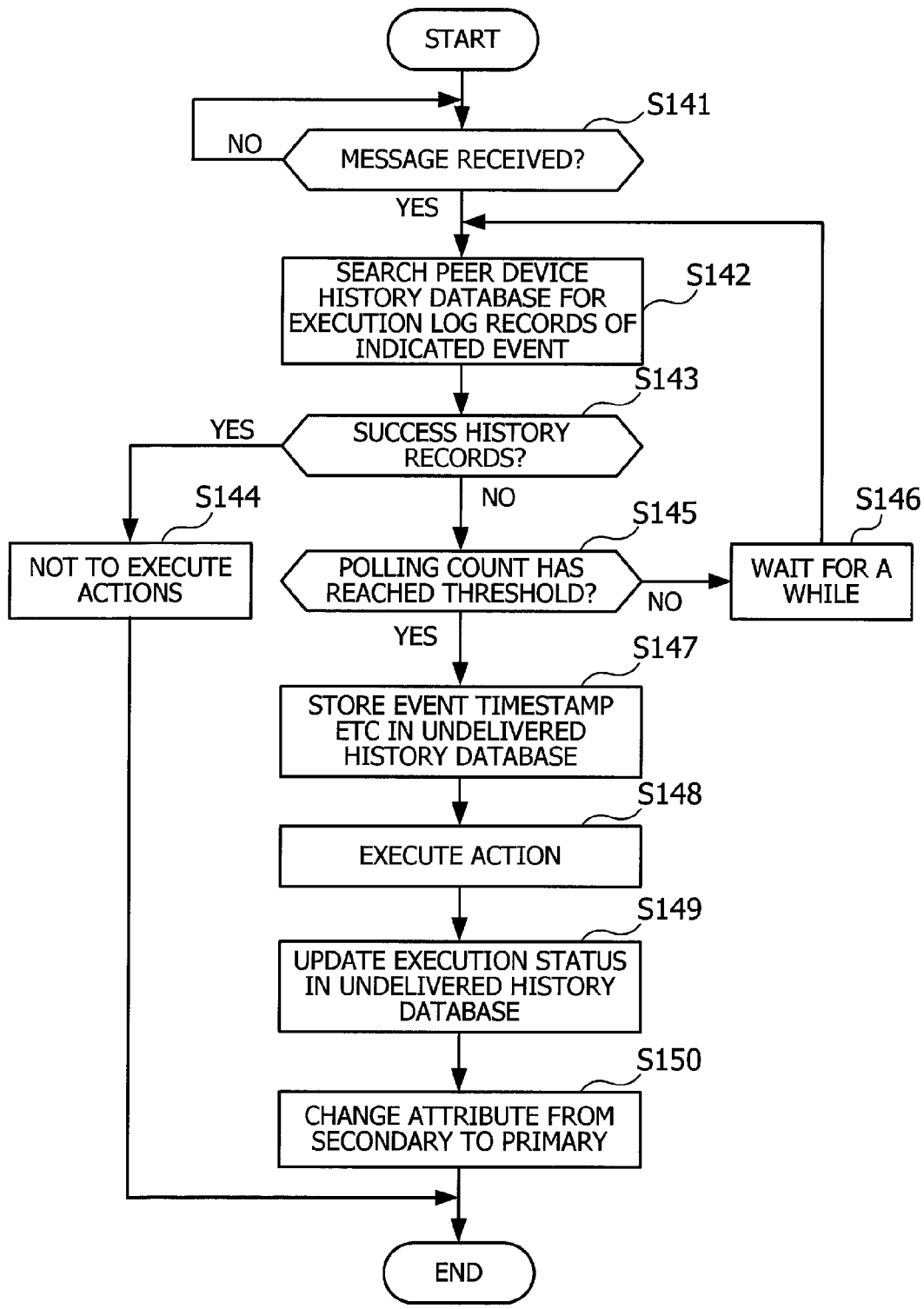
FIG. 16 is a flowchart describing operation of a secondary apparatus according to the second embodiment.

Referring now to the flowchart of FIG. 16, this section describes operation of a secondary apparatus according to the second embodiment. It is assumed, for example, that the first information processing apparatus 110 is primary while the second information processing apparatus 130 is secondary. The following explanation focuses on the second information processing apparatus 130, but the same explanation similarly applies to the first information processing apparatus 110 when it works as the secondary apparatus.

(S141) The attribute management unit 138b determines whether a message is received from monitored devices 210 and 220. The attribute management unit 138b proceeds to S142 upon receipt of a message. Otherwise, the attribute management unit 138b repeats this S141.

(S142) The attribute management unit 138b searches the peer device history database 135a for a first execution history record that matches with the event indicated by the message received at S141. More particularly, the attribute management unit 138b extracts a success log record that matches with the indicated event.

It is noted that the peer device history database 135a is constantly updated by the history updating unit 138a in the way described in FIG. 13 each time the second information processing apparatus 130 receives an action start notice or action end notice from the first information processing apparatus 110. The attribute management unit 138b can therefore check whether the first information processing apparatus 110 has successfully executed an action for the event in question before the second information processing apparatus 130 starts execution of the same.

(S143) The attribute management unit 138b proceeds to S144 when a success log record is extracted from the peer device history database 135a at S142. That is, S144 is taken when it is found that the first information processing apparatus 110 has successfully executed an action associated with the event indicated by the received message.

The attribute management unit 138b, on the other hand, proceeds to S145 when no success log record is extracted from the peer device history database 135a at S142. That is, S145 is taken when it is found that the first information processing apparatus 110 has failed to complete the action associated with the event indicated by the received message or has not executed the action.

(S144) The attribute management unit 138b decides not to execute actions for the event indicated by the message received at S141. In other words, the attribute management unit 138b restrains the second information processing apparatus 130 from executing actions for that event. Completion of this S144 marks the end of an action associated with a single message.

(S145) The attribute management unit 138b counts how many times it has performed the polling operation of S142 since the message was received from a monitored device at S141, and determines whether the count has reached a predetermined threshold. For example, the attribute management unit 138b resets a counter upon receipt of a message at S141, and each time the operation of S142 is executed, the attribute management unit 138b increments the counter and checks whether its value (hereafter "polling count") has reached a predetermined threshold.

The attribute management unit 138b proceeds to S146 when the above polling count is still below the threshold. The attribute management unit 138b proceeds to S147 when the polling count has reached the threshold. The threshold may be previously set to, for example, 10 or any other appropriate number which gives a total polling duration long enough for the first information processing apparatus 110 to complete a single action.

(S146) The attribute management unit 138b waits for a predetermined time (hereafter "polling interval"). In other words, the attribute management unit 138b waits for the first information processing apparatus 110 to successfully execute an action associated with the event indicated by the messages that the second information processing apparatus 130 has received. For example, the first information processing apparatus 110 is expected to complete a single action within a certain amount of time when it is in normal condition. The polling interval is previously set to be such an expected execution time (e.g., 60 seconds).

(S147) The history updating unit 138a starts an action for the event indicated by the message received at S141 and enters a second undelivered history record to the undelivered history database 136a to record the event timestamp and other information.

(S148) The action execution unit 134 executes an action for the event indicated by the received message. Suppose, for example, that the event type of interest is associated with an action of e-mail notification. The action execution unit 134 sends the terminal device 300 an e-mail message that indicates occurrence of an event, as well as providing some details of the event. When this e-mail message is delivered to the terminal device 300, the attribute management unit 138b regards it as successful execution of the action. When the e-mail message fails to reach the terminal device 300, the attribute management unit 138b takes it as failed execution of the action. As the action has ended, the attribute management unit 138b proceeds to S149.

(S149) The attribute management unit 138b updates the aforementioned second undelivered history record in the undelivered history database 136a by changing its execution status field to "Executed." The attribute management unit 138b also adds execution result information to the same field. In the case where the action has failed, the attribute management unit 138b repeats the procedure of S147 to S149 to retry the same action. Upon completion of S149, the attribute management unit 138b proceeds to S150.

(S150) The attribute management unit 138b changes the attribute data stored in the third storage unit 137 from secondary to primary, so that the second information processing apparatus 130 operates as the primary apparatus. Completion of this S150 marks the end of an action associated with a single message.

The above section (xii) has described how the secondary apparatus operates according to the second embodiment.

(xiii) Variation #1: Adjustment of Polling Interval

This section describes variation #1, a first variation of the second embodiment which provides two methods for adjustment of the aforementioned polling interval. One method is to define multiple polling intervals for different action types. The other method is to vary the polling interval based on the measurement of action execution times. For illustration, the following explanation assumes that the second information processing apparatus 130 is secondary and configured to adjust its polling interval. The first information processing apparatus 110 would also operate in a similar way when its attribute is set to secondary.

The second information processing apparatus 130 in variation #1 stores in its third storage unit 137 a piece of information that specifies a threshold (upper limit) of the foregoing polling count and an initial value of polling interval. The attribute management unit 138b executes polling operations based on this information, while measuring execution time of each action, i.e., the time consumed to execute a single action of each particular type. For example, the attribute management unit 138b starts time measurement upon receipt of an action start notice and stops it upon receipt of an action end notice, thus obtaining the time between these two points. The attribute management unit 138b then records the measured execution time in the third storage unit 137. Since the execution time may depend on the action types, the control unit 138 collects such execution time information for each different action type.

Figure 17:
FIG. 17 illustrates an example of data used to generate a polling interval table according to a first variation (variation #1) of the second embodiment.

The attribute management unit 138b further calculates an average of the past measurements and current measurement of execution times for each particular action type. For example, the attribute management unit 138b maintains a collection of execution time values and their averages for various action types as seen in FIG. 17. FIG. 17 illustrates an example of data used to generate a polling interval table according to variation #1 of the second embodiment. Based this data, the attribute management unit 138b produces a polling interval table that associates action types with average execution times. The produced polling interval table is stored in the third storage unit 137.

Each time the first information processing apparatus 110 executes an action, the attribute management unit 138b measures its execution time and calculates the average of those measurements of execution time. The attribute management unit 138b updates the polling interval table with such new average values. The polling interval table thus stores a collection of average execution times corresponding to different action types. The attribute management unit 138b uses these average execution times to set the polling interval of each particular action type. The setup of polling intervals may be established each time the polling interval table is updated or when the number of measurements of execution time exceeds a certain threshold. It may also be possible to set up the polling intervals upon request from the user.

Figure 18:
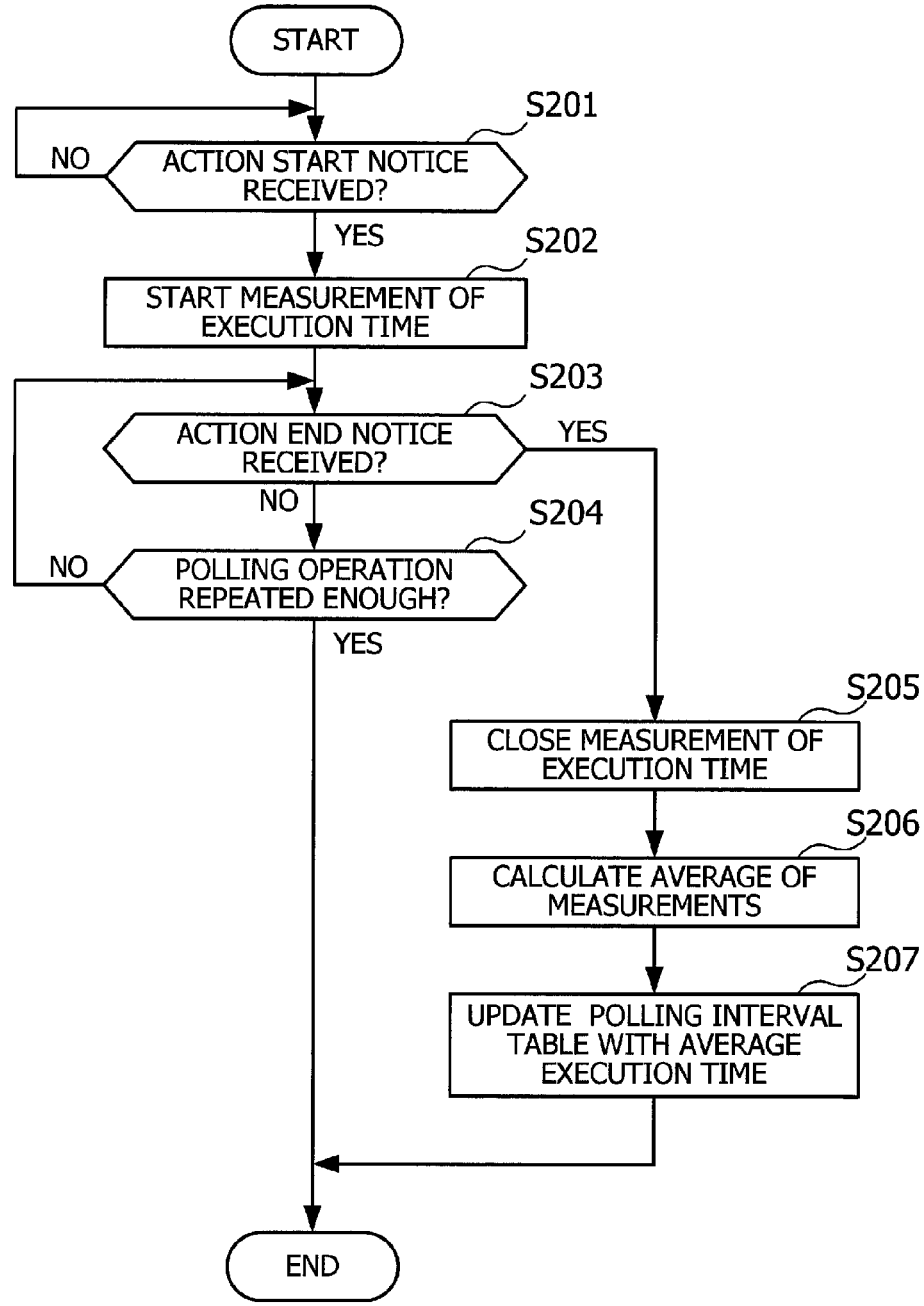
FIG. 18 is a flowchart explaining how a polling interval table is updated according to the first variation (variation #1) of the second embodiment.

Referring now to the flowchart of FIG. 18, the following description explains how the polling interval table is updated according to variation #1 of the second embodiment.

(S201) The attribute management unit 138b determines whether an action start notice is received from the first information processing apparatus 110. The attribute management unit 138b proceeds to S202 upon receipt of an action start notice. Otherwise, the attribute management unit 138b repeats this S201.

(S202) The attribute management unit 138b starts measurement of the execution time of an action. More specifically, the attribute management unit 138b records the start time of the measurement.

(S203) The attribute management unit 138b determines whether an action end notice is received from the first information processing apparatus 110. The attribute management unit 138b proceeds to S205 upon receipt of an action end notice since it indicates that the first information processing apparatus 110 has completed one action. The attribute management unit 138b proceeds to S204 when there is no action end notice.

(S204) The attribute management unit 138b determines how many times the polling operation has been repeated. When this polling count has reached a predetermined threshold, the attribute management unit 138b exits from the current process, without updating the polling interval table. In other words, the polling interval table is not updated in the case where the attribute management unit 138b proceeds from S145 to S147 in the flowchart of FIG. 16. When the polling count is still below the threshold, the attribute management unit 138b goes back to S203.

(S205) The attribute management unit 138b ends the measurement of execution time. More specifically, the attribute management unit 138b records the end time of the measurement and calculates a difference between the start time and the end time, thereby determining the execution time.

(S206) The above S205 has brought the attribute management unit 138b a measurement value of execution time of a particular action type. The attribute management unit 138b maintains a collection of past such measurements, which may include those of the same particular action type. The attribute management unit 138b then calculates an average of the current measurement value of execution time and the past measurements of the same.

(S207) The attribute management unit 138b updates the polling interval table with the average calculated at S206. Completion of this S207 permits the attribute management unit 138b to exit from the current table updating process.

The above description has discussed variation #1 of the second embodiment. With this variation #1, the polling intervals are determined from actual execution times of actions that are measured and processed for each different action type. This feature enables the secondary information processing apparatus to take over the role of primary in a timely manner when the current primary information processing apparatus encounters a problem. The proposed feature of polling interval adjustment also contributes to a reduced frequency of access to the peer device history database 135a, thus alleviating the processing load relating to polling operations.

The above explanation assumes that the maximum number of polling operations is limited by a fixed threshold. Alternatively, the threshold may be varied depending on execution times. For example, assuming that the polling interval is fixed, an increased threshold will bring about a longer wait period for detecting failure in the primary apparatus. A decreased threshold results in a shorter wait period for detecting failure in the primary apparatus. By varying the threshold depending on actual measurements of execution time, the secondary information processing apparatus can change its attribute and take over the role of the primary apparatus at an appropriate time.

(xiv) Variation #2: Execution Request to Secondary

This section describes a second variation of the second embodiment. This variation, referred to as variation #2, proposes a technique for the primary information processing apparatus to delegate some of its pending actions to the secondary information processing apparatus when the primary apparatus is heavily loaded. For illustration, the following explanation assumes that the first information processing apparatus 110 is primary while the second information processing apparatus 130 is secondary. The same explanation also applies to the case in which the two information processing apparatuses 110 and 130 work in the other way around.

a) Operation with Action Load Table

Figure 19:
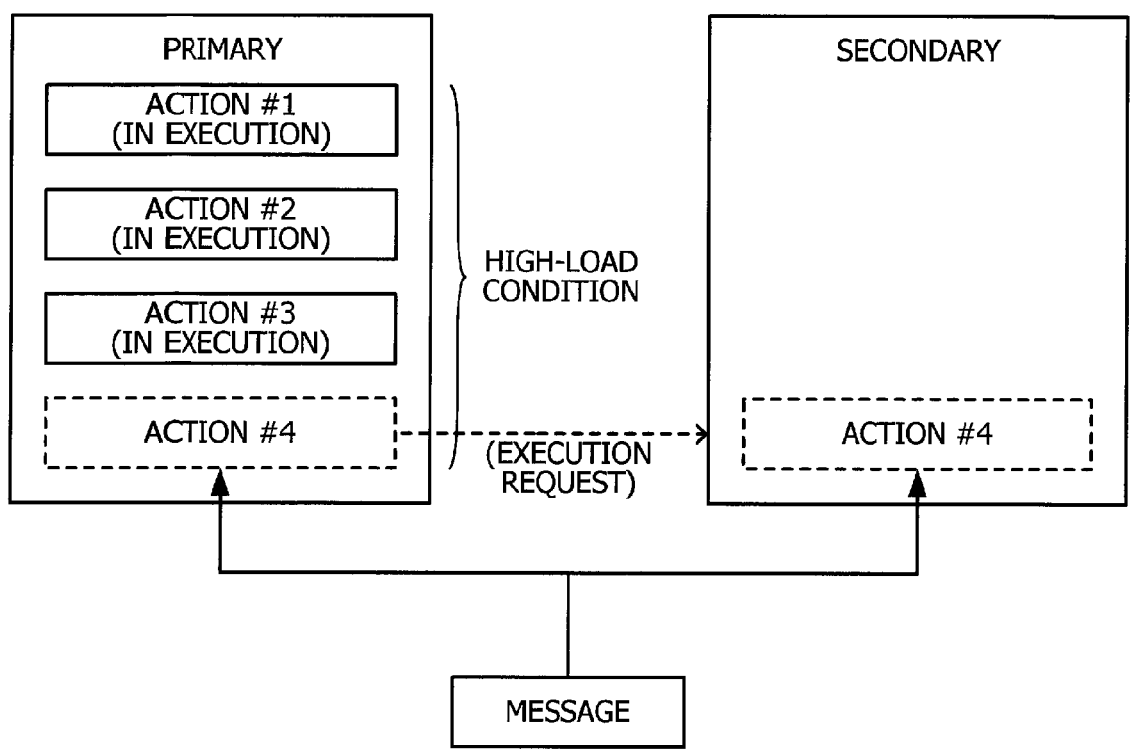
FIG. 19 explains operation of primary and secondary apparatuses according to a second variation (variation #2) of the second embodiment.

Referring to FIG. 19, the primary and secondary apparatuses operate as follows in variation #2 of the second embodiment. Suppose, for example, that the first information processing apparatus 110 (primary) is executing three actions #1 to #3, and that a new message arrives at the first information processing apparatus 110 and second information processing apparatus 130, invoking an additional action #4. It would be more efficient for the first information processing apparatus 110 (primary) to delegate action #4 to the second information processing apparatus 130 (secondary) than execute the action by itself under the high-load condition. For this reason, variation #2 of the second embodiment configures the first information processing apparatus 110 to estimate its own load condition (e.g., CPU usage) with the assumption that it executes action #4 by itself. When the estimated load is high, and only when predetermined conditions are met, the first information processing apparatus 110 requests the second information processing apparatus 130 to execute action #4.

The first information processing apparatus 110 makes the above estimation by, for example, evaluating a value that represents the load condition of the apparatus, which is referred to as the "action load value." For example, the attribute management unit 118b delegates the second information processing apparatus 130 to execute action #4 when the action load value exceeds a predetermined threshold (hereafter "action switching threshold"). Action load values are calculated by the attribute management unit 118b and recorded in an action load table stored in the third storage unit 117.

Figure 20:
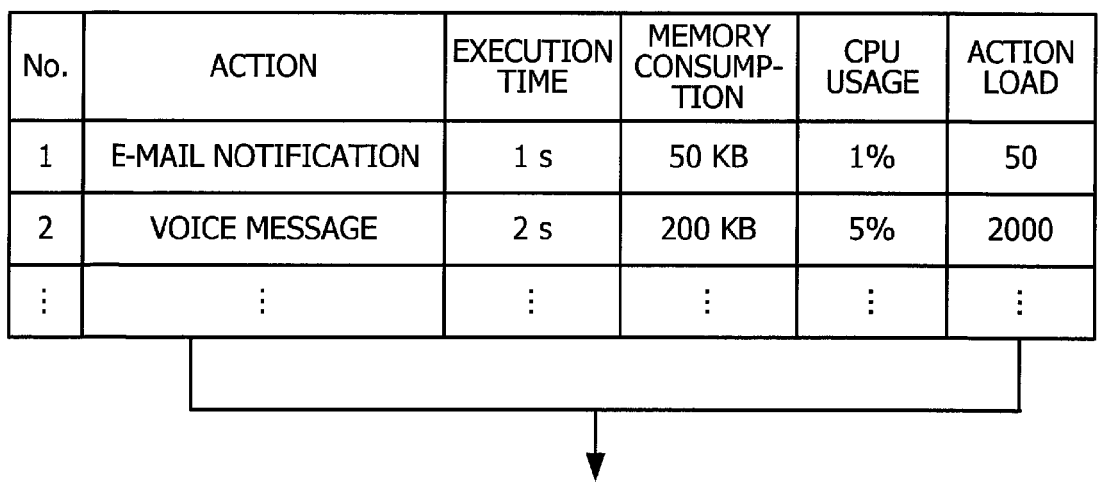
FIG. 20 illustrates an example of data used to generate an action load table according to the second variation (variation #2) of the second embodiment.

Referring now to FIG. 20, the following description explains how action load values are calculated, as well as how an action load table is produced, according to variation #2 of the second embodiment. Specifically, FIG. 20 illustrates an example of data used to produce an action load table.

Action load values are calculated for different action types. When executing an action, the attribute management unit 118b records the average memory consumption and average CPU usage during the execution, in addition to execution time of the action. The attribute management unit 118b then calculates an action load value as follows: [Execution Time (s)]×[Average Memory Consumption (KB)]×[Average CPU Usage (%)] This formula is only an example, as are the units of variables.

Referring to the example of FIG. 20, the topmost row indicates an action that falls in the action type of "e-mail notification" and was executed in an execution time of "1 s" with an average memory consumption of "50 KB" and an average CPU usage of "1%." The action load value in this case is calculated as (1×50×1)=50. The same calculation applies to the other action types. The attribute management unit 118b calculates action load values in this way and compiles the results into an action load table.

Each entry of this action load table represents an average of action load values of a particular action type. That is, when a new action load value is obtained for an existing action type, the attribute management unit 118b updates its corresponding entry of the action load table by averaging them.

b) Update of Action Load Table

Figure 21:
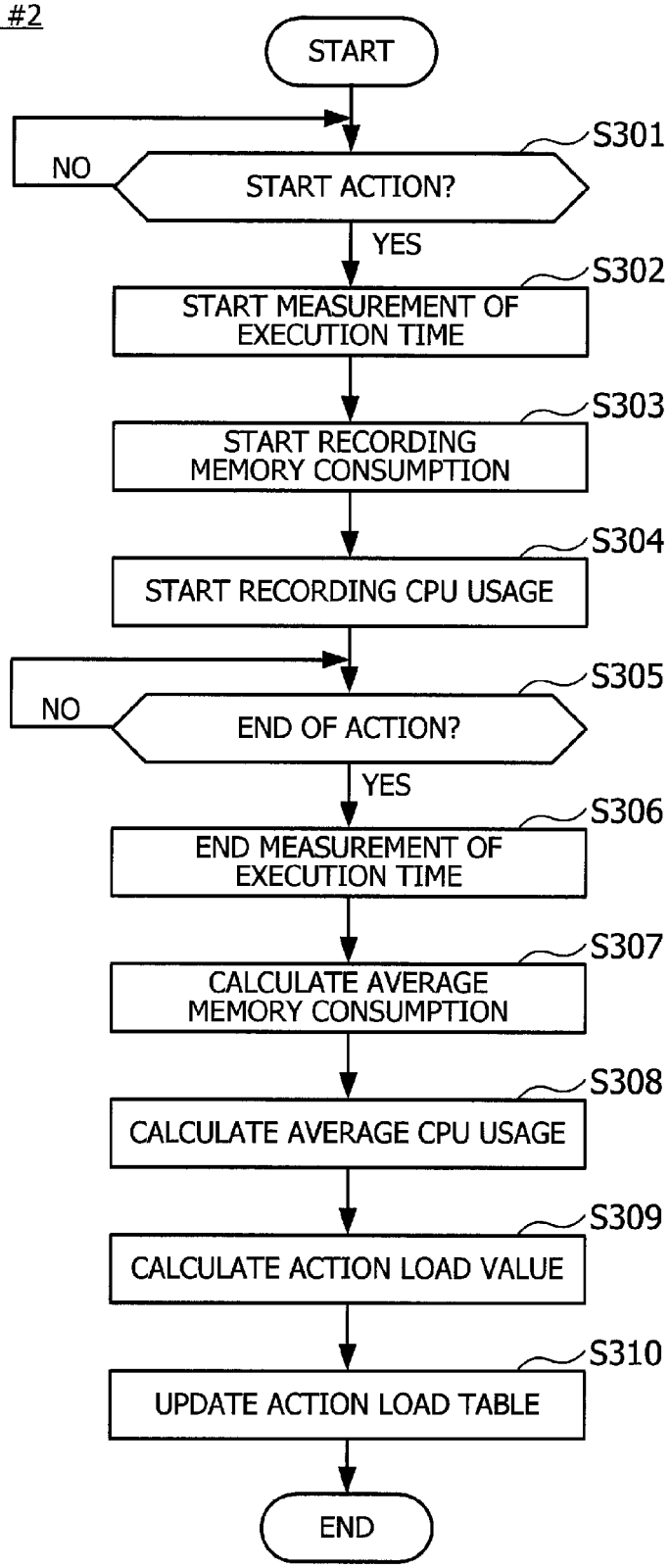
FIG. 21 is a flowchart explaining how an action load table is updated according to the second variation (variation #2) of the second embodiment.

Referring to the flowchart of FIG. 21, the following description explains how the action load table is updated according to variation #2 of the second embodiment.

(S301) The attribute management unit 118b determines whether it has an action to start. When it is determined to start an action, the attribute management unit 118b proceeds S302. This means that S302 is taken when the attribute management unit 118b proceeds to S128 or S131 discussed in the flowchart of FIG. 15. The attribute management unit 118b repeats S301 when there are no actions to start.

(S302) The attribute management unit 118b starts measurement of execution time. For example, the attribute management unit 118b records the start time of the action.

(S303) The attribute management unit 118b starts recording memory consumption for later calculation of an action load value. More specifically, the attribute management unit 118b collects data of memory consumption at predetermined intervals until the action is completed. It is assumed that the interval has previously been specified by the user.

(S304) The attribute management unit 118b starts recording CPU usage for later calculation of an action load value. More specifically, the attribute management unit 118b collects data of CPU usage at predetermined intervals until the action is completed. The interval has previously been specified by the user. It is noted that the attribute management unit 118b may perform S302, S303, and S304 in a different order.

(S305) The attribute management unit 118b determines whether the action has come to an end. The attribute management unit 118b proceeds to S306 upon end completion of the action. This means that S306 is taken when the attribute management unit 118b proceeds to S129 or S132 discussed in the flowchart of FIG. 15. The attribute management unit 118b repeats S305 when the action in question is still in execution.

(S306) The attribute management unit 118b ends the measurement of execution time. For example, the attribute management unit 118b records the end time of the action and calculates a difference between the start time and the end time, thereby determining the execution time.

(S307) The attribute management unit 118b reads and averages the records of memory consumption that are collected during the period from the start at S303 to the end of the action. The attribute management unit 118b uses the resulting average memory consumption in later calculation of an action load value.

(S308) The attribute management unit 118b reads and averages the records of CPU usage that are collected during the period from the start at S304 to the end of the action. The attribute management unit 118b uses the resulting average CPU usage in the subsequent calculation of an action load value. It is noted that the attribute management unit 118b may perform S306, S307, and S308 in a different order.

(S309) The attribute management unit 118b calculates an action load value by multiplying together the execution time, average memory consumption, and average CPU usage respectively obtained at S306 to S308.

(S310) The attribute management unit 118b updates the action load table with the action load value calculated at S309. The action load table may already have an action load value that falls in the same category as the one calculated at S309. In this case, the attribute management unit 118b updates the action load table with the average of those two action load values. Completion of this S310 permits the attribute management unit 118b to exit from the table updating process.

c) Update of Action Switching Threshold

Figure 22:
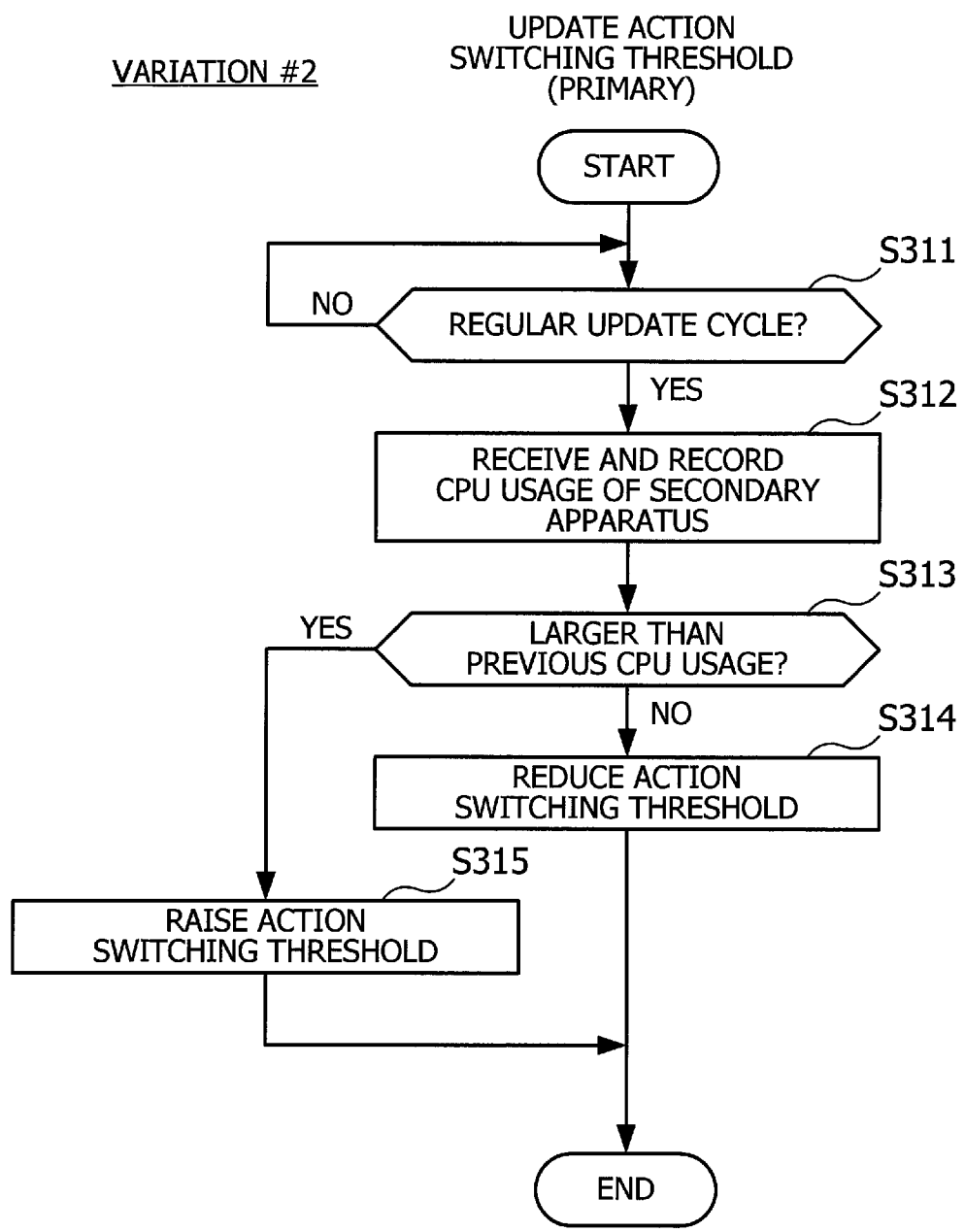
FIG. 22 is a flowchart explaining how an action switching threshold is updated according to the second variation (variation #2) of the second embodiment.

Referring now to the flowchart of FIG. 22, this section describes how an action switching threshold is updated according to variation #2 of the second embodiment. As mentioned above, the action switching threshold is used to determine whether the primary information processing apparatus is in a high-load condition. A larger action switching threshold makes it less likely for the primary apparatus to delegate actions to the secondary apparatus. A smaller action switching threshold makes it more likely for the primary apparatus to delegate actions to the secondary apparatus.

(S311) The attribute management unit 118b determines whether it is the time to update the action switching threshold. While there may be various selections for the timing, the present description assumes for illustration that the action switching threshold is updated at regular time intervals. Accordingly the attribute management unit 118b advances from S311 to S312 at regular time intervals. Otherwise, the attribute management unit 118b repeats S311.

(S312) The attribute management unit 118b requests the second information processing apparatus 130 to provide information about its CPU usage. Upon receipt of the requested information, the attribute management unit 118b records the received CPU usage information.

(S313) The attribute management unit 118b consults a record of CPU usage that was received in the previous update. This record indicates a previous CPU usage in the second information processing apparatus 130. The attribute management unit 118b also consults a record of CPU usage that has just been received in the current update. This record indicates a current CPU usage in the second information processing apparatus 130. The attribute management unit 118b then compares the previous CPU usage with the current CPU usage.

When the current CPU usage is larger than the previous CPU usage, the attribute management unit 118b advances to S315. When the current CPU usage is smaller than or equal to the previous CPU usage, the attribute management unit 118b advances to S314.

(S314) The attribute management unit 118b reduces the action switching threshold. That is, the attribute management unit 118b sees no particular hike in the load condition of the second information processing apparatus 130 since the last update of the action switching threshold. This indicates that there is still some room in the second information processing apparatus 130. Accordingly the attribute management unit 118b reduces the action switching threshold to make it easier for the primary apparatus to delegate actions to the secondary apparatus. Completion of this S314 means the end of a single update cycle of the action switching threshold.

(S315) The attribute management unit 118b raises the action switching threshold. That is, the last update of the action switching threshold appears to have degraded the load condition of the second information processing apparatus 130. Accordingly the attribute management unit 118b raises the action switching threshold to make it difficult for the primary apparatus to delegate actions to the secondary apparatus. Completion of this S315 means the end of a single update cycle of the action switching threshold.

d) Execution Request

Figure 23:
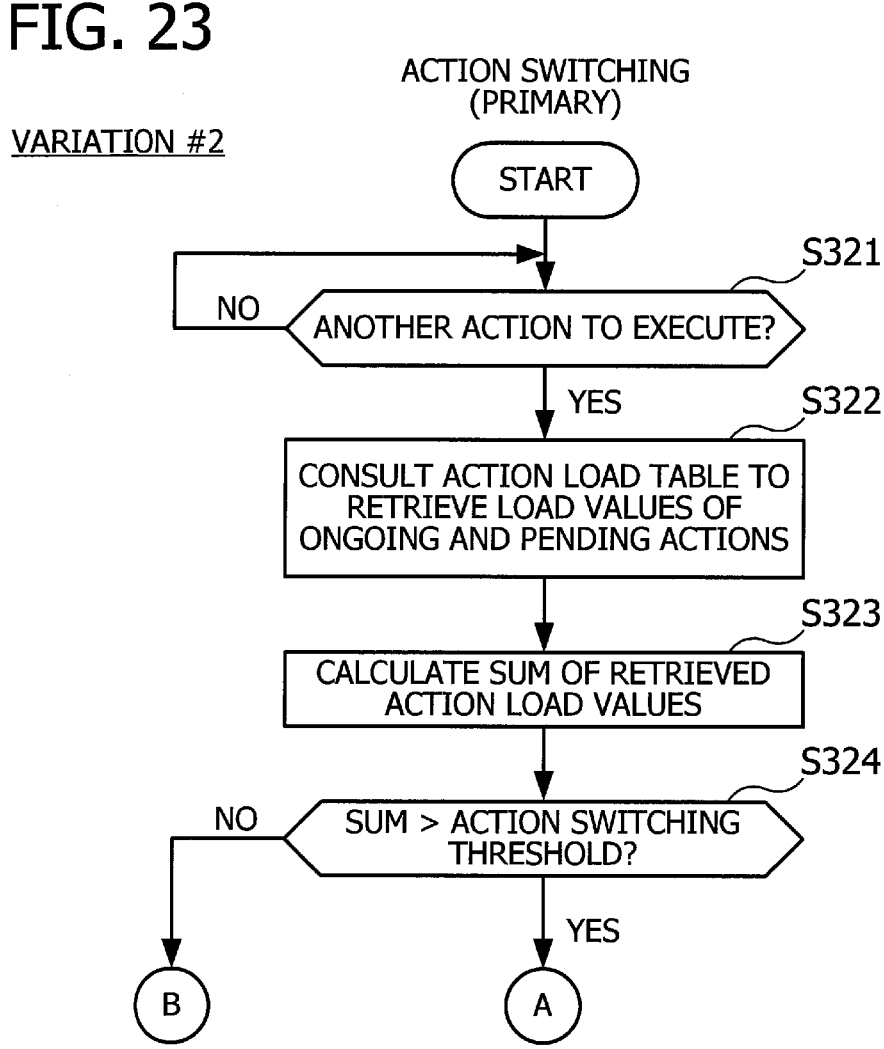
FIGS. 23 and 24 are first and second parts of a flowchart explaining how the primary apparatus determines whether to send an execution request in the second variation (variation #2) of the second embodiment.
Figure 24:
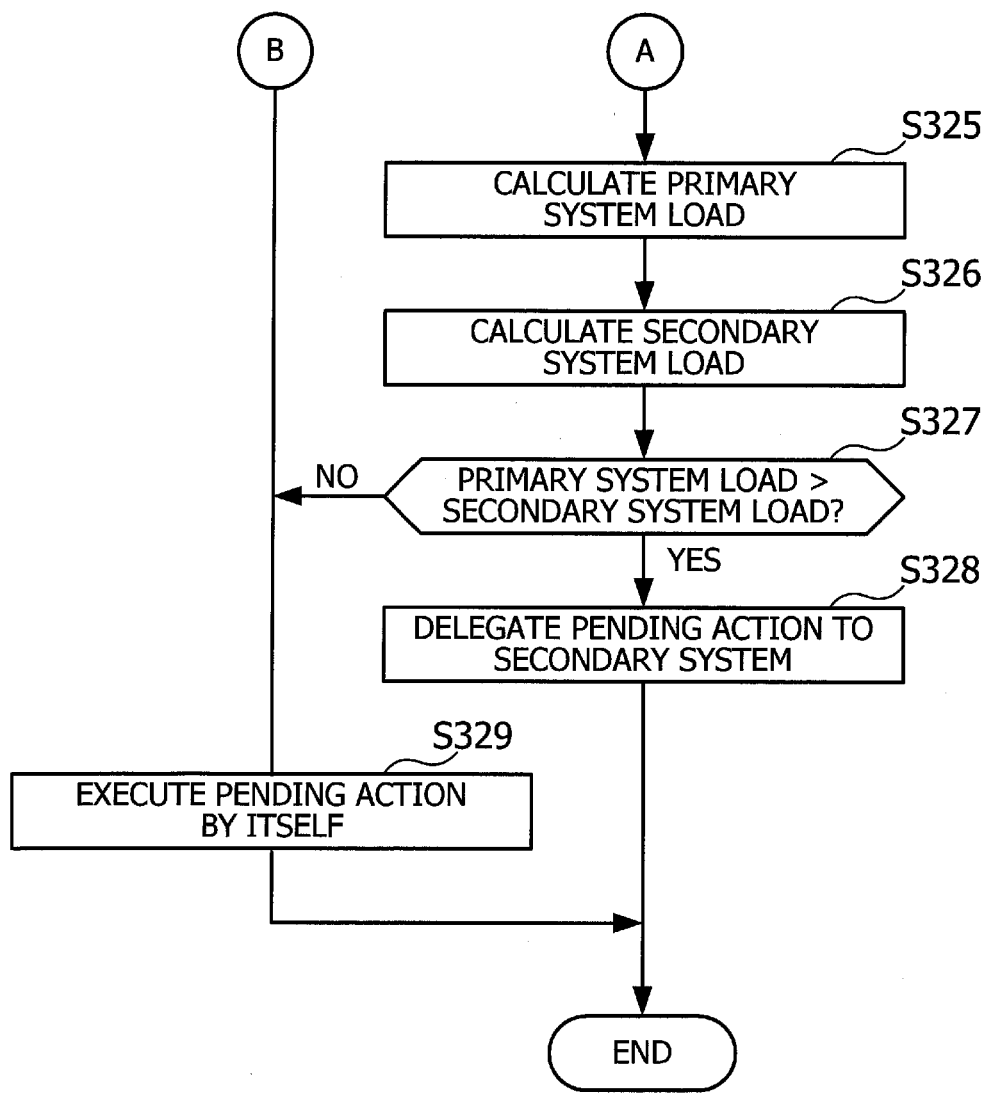

Referring now to the flowcharts of FIGS. 23 and 24, the following description explains how the primary apparatus determines whether to send an execution request to the secondary apparatus by using the above-described action load table. FIG. 23 is a first flowchart illustrating this determination as to the action switching operation according to variation #2 of the second embodiment. It is assumed again that the first information processing apparatus 110 is primary.

(S321) The attribute management unit 118b determines whether a need has arisen to execute another action. When there is such an action, the attribute management unit 118b proceeds to S322. In other words, the attribute management unit 118b executes S322 and subsequent steps before starting S126 of FIG. 15, rather than directly moving from S123 to S126. The attribute management unit 118b repeats S321 until it finds a pending action to execute.

(S322) The attribute management unit 118b searches the action load table to find an action load value whose action type matches with the action being executed. In the case where a plurality of actions are executed concurrently, the attribute management unit 118b retrieves action load values for all those ongoing actions. The attribute management unit 118b also retrieves an action load value whose action type matches with the pending action to be executed.

(S323) The attribute management unit 118b adds up the action load values of ongoing and pending actions, thus obtaining a sum of them. When there are a plurality of ongoing actions, the attribute management unit 118b includes all of their action load values in this summation.

(S324) The attribute management unit 118b determines whether the sum of action load values calculated at S323 is greater than the action switching threshold. The former value represents the expected load condition of the first information processing apparatus 110, while the latter value represents a threshold for determining whether to send an execution request to the second information processing apparatus 130. When the sum is greater than the action switching threshold, the attribute management unit 118b advances to S325 of FIG. 24. When the sum is smaller than or equal to the action switching threshold, the attribute management unit 118b goes to S329 of FIG. 24.

FIG. 24 is a second flowchart that explains how the control unit 118 determines whether to send execution requests in variation #2 of the second embodiment.

(S325) The attribute management unit 118b calculates a primary system load that represents the current load condition of the first information processing apparatus 110 itself. For example, the attribute management unit 118b detects the current CPU usage and memory consumption and calculates a primary system load as [CPU Usage]×[Memory Consumption]. This primary system load actually indicates the load condition of the attribute management unit 118b itself at the moment when it makes a determination on the action switching.

(S326) The attribute management unit 118b calculates a secondary system load that represents the current load condition of the second information processing apparatus 130. For example, the attribute management unit 118b requests the second information processing apparatus 130 to provide information about its CPU usage and memory consumption. Based on the received information, the attribute management unit 118b then calculates a secondary system load as [CPU Usage]×[Memory Consumption]. This secondary system load indicates the actual load condition of the second information processing apparatus 130 at the moment when the first information processing apparatus 110 makes a determination on the action switching. It is noted that S326 may be executed before S325.

(S327) The attribute management unit 118b compares the primary system load with the secondary system load. When the primary system load is greater than the secondary system load, the attribute management unit 118b proceeds to S328. That is, S328 is taken when the pending action, if executed, would invite a high-load condition, and when the current load of the second information processing apparatus 130 is lighter than that of the first information processing apparatus 110.

When, on the other hand, the primary system load is smaller than or equal to the secondary system load, the attribute management unit 118b proceeds to S329. That is, S329 is taken when the current load of the second information processing apparatus 130 is heavier than that of the first information processing apparatus 110, while it is known that the pending action would invite a high-load condition.

(S328) The attribute management unit 118b requests the secondary apparatus to execute the pending action. For example, the attribute management unit 118b sends an execution request to the second information processing apparatus 130, including information (e.g., event ID and source device name) that indicates the message corresponding to the pending action. Upon completion of this S328, the attribute management unit 118b exits from the current process of action switching, deciding not to execute the action of interest. In other words, the attribute management unit 118b exits without going to S126 in the flowchart of FIG. 15.

(S329) The attribute management unit 118b executes the pending action in the first information processing apparatus 110. In other words, the attribute management unit 118b proceeds to S126 in the flowchart of FIG. 15. Upon completion of this S329, the attribute management unit 118b exits from the process of action switching.

e) Operation of Secondary Apparatus

Figure 25:
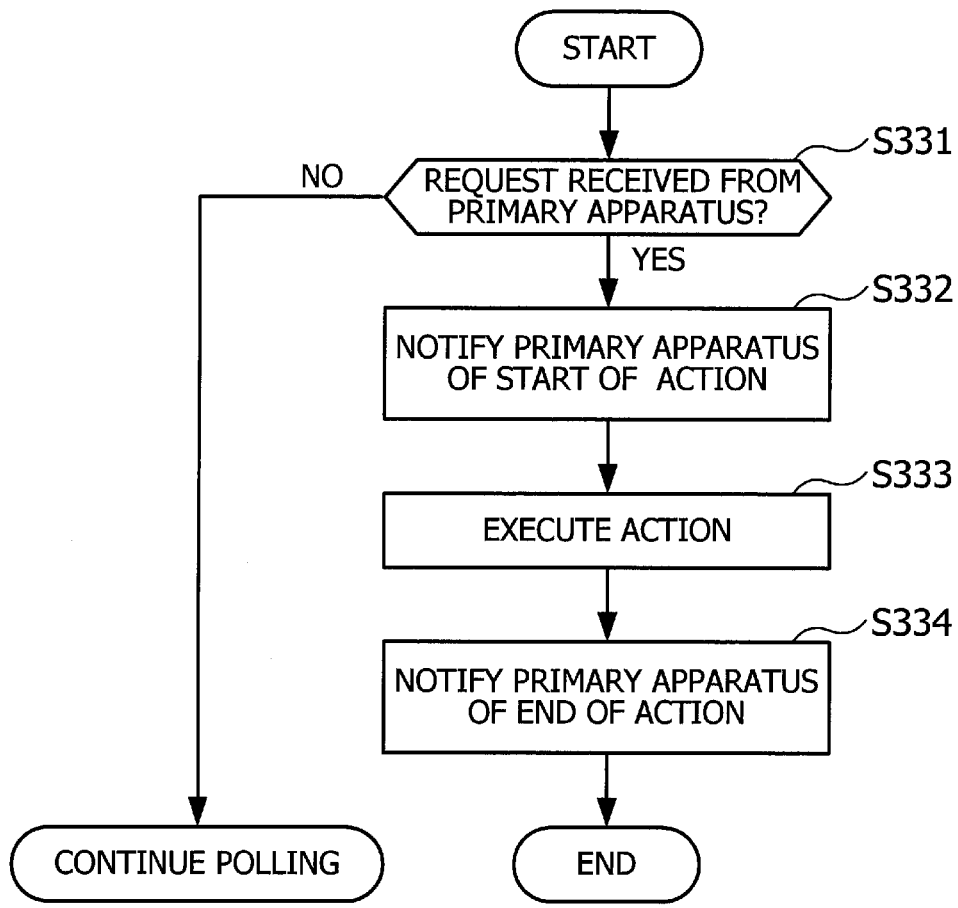
FIG. 25 is a flowchart explaining operation of the secondary apparatus according to the second variation (variation #2) of the second embodiment.

Referring now to the flowchart of FIG. 25, the following description explains how the secondary apparatus operates in variation #2 of the second embodiment when an execution request is received from the primary apparatus. The description assumes that the first information processing apparatus 110 is primary while the second information processing apparatus 130 is secondary.

(S331) The attribute management unit 138b in the second information processing apparatus 130 (secondary) determines whether an execution request is received from the first information processing apparatus 110. Each time a message is received from monitored devices, the attribute management unit 138b in the secondary apparatus repeats polling success log records until the polling count reaches a threshold, and the history updating unit 138a accumulates them in a peer device history database 135a. The first information processing apparatus 110, on the other hand, executes the above-described determination of action switching and, when predetermined conditions are met, sends an execution request to the second information processing apparatus 130. Upon receipt of such an execution request, the attribute management unit 138b proceeds to S332. Otherwise, the attribute management unit 138b continues the polling.

(S332) The attribute management unit 138b triggers execution of an action specified in the received execution request, thus sending an action start notice to notify the first information processing apparatus 110 of the start.

(S333) The action execution unit 134 executes the action. For example, the action execution unit 134 sends the terminal device 300 an e-mail message that indicates occurrence of an event, as well as providing some details of the event. When this e-mail message is delivered to the terminal device 300, the attribute management unit 138*b* regards it as successful execution of the action. When the e-mail message fails to reach the terminal device 300, the attribute management unit 138*b* takes it as failed execution of the action. As the action has ended, the attribute management unit 138*b* proceeds to S334.

(S334) The attribute management unit 138*b* sends an action end notice to the first information processing apparatus 110 to indicate that the action has come to an end. When the action is aborted, the attribute management unit 118*b* may retry the same action by repeating the above procedure, i.e., sending an action start notice, executing the action, and sending an action end notice. Completion of this S334 marks the end of the requested action.

As can be seen from the above description, variation #2 of the second embodiment enables the primary apparatus to delegate some actions to the secondary apparatus when the former is in a high-load condition. Before executing a new action, the primary apparatus determines whether to send an execution request to the secondary apparatus, considering both of the following things: (1) expected impact of the new action on its own load condition, and (2) current load condition of the primary apparatus and secondary apparatus. Variation #2 thus contributes to appropriate determination of whether to send an execution request to the secondary apparatus. For example, it is inappropriate to delegate actions in the case where the secondary apparatus is too busy in other tasks than actions.

(xv) Variation #3: Simplified Undelivered History Database

This section describes variation #3, a third variation of the second embodiment. Variation #3 proposes a method for reducing the amount of data in undelivered history records, which may be transmitted to an information processing apparatus in the process of recovery from failure. The proposed method is also expected to reduce the amount of data stored in the undelivered history databases 116*a* and 136*a*. While the following description will focus on one undelivered history database 116*a* in the first information processing apparatus 110, the same description also applies to the other undelivered history database 136*a* in the second information processing apparatus 130.

a) Undelivered History Database

FIG. 26 illustrates an example of an undelivered history database according to variation #3 of the second embodiment. As seen from FIG. 26, the undelivered history database 116*a* of variation #3 only records the source device name and event timestamp. In other words, these two data items suffice for the purpose of the undelivered history database 116*a*. More specifically, each source device name is associated with a single record of event timestamp that is kept up-to-date.

Suppose, for example, the attribute management unit 118*b* has a specific source device name and its latest event timestamp to register. In this case, the attribute management unit 118*b* first checks whether the undelivered history database 116*a* has an existing entry with the same source device name. When such an existing entry is found in the undelivered history database 116*a*, the attribute management unit 118*b* updates its event timestamp field with the latest event timestamp. When no such entries are found, the attribute management unit 118*b* produces a new entry of the undelivered history database 116*a* to register the source device name and event timestamp.

b) Update of Undelivered History Database

Referring to the flowchart of FIG. 27, the following description explains how the undelivered history database is updated according to variation #3 of the second embodiment. With a slight modification to the flowcharts of FIGS. 15 and 16, this variation #3 applies to the first information processing apparatus 110, whether it is primary or secondary. That is, when the first information processing apparatus 110 is primary, the flowchart of FIG. 15 is modified to eliminate S130 and S132 and insert the process flow of FIG. 27 after S131. When the first information processing apparatus 110 is secondary, the flowchart of FIG. 16 is modified to eliminate S147 and S149 and insert the process flow of FIG. 27 after S149.

(S401) The attribute management unit 118*b* determines whether the action has been executed successfully. The attribute management unit 118*b* proceeds to S402 upon successful execution. Otherwise, the attribute management unit 118*b* repeats this S401.

(S402) The attribute management unit 118*b* searches the undelivered history database 116*a* for an existing record having the same source device name as the source device of an event that has triggered the executed action.

(S403) When the above search finds a match in the undelivered history database 116*a*, the attribute management unit 118*b* then proceeds to S405. The presence of a match in the undelivered history database 116*a* means that the first information processing apparatus 110 has successfully executed an action that is triggered by some event at the above-noted source device during a down time of the second information processing apparatus 130. Under this condition, the attribute management unit 118*b* makes its way to S405.

On the other hand, when the above search finds no matches in undelivered history database 116*a*, the attribute management unit 118*b* then proceeds to S404. The absence of matches in the undelivered history database 116*a* means either that there have been no events at the noted source device during a down time of the second information processing apparatus 130, or that there was an event at the noted source device, but it ended up with unsuccessful execution of actions by the first information processing apparatus 110. Under this situation, the attribute management unit 118*b* makes its way to S404.

(S404) The attribute management unit 118*b* adds a new record of source device name and event timestamp to the undelivered history database 116*a* to register the event that has caused the executed action. Upon completion of S404, the attribute management unit 118*b* exits from the current process of FIG. 27. The attribute management unit 118*b* thus terminates the process flow of FIG. 15, or proceeds to S150 in the process flow of FIG. 16.

(S405) The attribute management unit 118*b* compares the event timestamp of the executed action with the event timestamp in the above record found in the undelivered history database 116*a*. When the latter timestamp is older, the attribute management unit 118*b* updates this old record in the second storage unit 116 with the event timestamp associated with the executed action. Upon completion of S405, the attribute management unit 118*b* exits from the current process of FIG. 27. The attribute management unit 118*b* thus terminates the process flow of FIG. 15, or proceeds to S150 in the process flow of FIG. 16.

c) Finding Success Log Record based on Undelivered History Records

The proposed simplification of undelivered history records leads to a modification to the recovery process of the second information processing apparatus 130. More specifically, the second information processing apparatus 130 operates differently from the original second embodiment when it determines whether the first information processing apparatus 110 successfully processed an event corresponding to a particular undelivered message. This is also true to the recovery process of the first information processing apparatus 110.

Referring now to the flowchart of FIG. 28, the following description explains how the presence of a success history record is determined based on the undelivered history database according to variation #3 of the second embodiment.

(S411) During its recovery process, the second information processing apparatus 130 has obtained a set of undelivered history records from the first information processing apparatus 110. The attribute management unit 138b searches this set of undelivered history records to seek the source device name indicated in the undelivered message in question.

(S412) The attribute management unit 138b determines whether the above S411 has found the source device name in an undelivered history record. That is, the first information processing apparatus 110 may possibly have finished actions for at least one event that occurred at a monitored device having the noted source device name, during the down time of the second information processing apparatus 130. By searching undelivered history records, the attribute management unit 138b determines whether this is the case for the event indicated by the undelivered message in question. When S411 has found the source device name in question, the attribute management unit 138b proceeds to S413. When S411 has failed to find the source device name in question, the attribute management unit 138b proceeds to S415.

(S413) The attribute management unit 138b now has two event timestamps, one extracted from the undelivered message in question and the other extracted from the undelivered history record that is found, both of which are associated with the same source device name. The control unit 138 then determines whether the latter event timestamp is newer than the former event timestamp. In other words, the attribute management unit 138b determines whether the first information processing apparatus 110 has successfully executed actions for some event that occurred later than the one indicated in the undelivered message. When the undelivered history record has a newer event timestamp, the attribute management unit 138b proceeds to S414. When the undelivered message has a newer event timestamp, the attribute management unit 138b proceeds to S415.

(S414) The attribute management unit 138b concludes that the first information processing apparatus 110 has successfully executed actions for the event indicated in the undelivered message in question. Now that the presence of a success log record is determined based on the undelivered history records, the attribute management unit 138b exits from the current process upon completion of S414, without executing actions for the event indicated by the undelivered message.

(S415) The attribute management unit 138b concludes that the first information processing apparatus 110 has not executed actions, or has aborted actions, for the event indicated in the undelivered message in question. Now that the absence of success log records is determined based on the undelivered history records, the attribute management unit 138b exits from the current process upon completion of S415, deciding to execute actions for the event indicated by the undelivered message.

As can be seen from the above description, the proposed variation #3 of the second embodiment reduces the amount of data stored in the undelivered history database 116a by restricting its content to the latest success log records. The downsizing of the undelivered history database 116a also contributes to reduction in the amount of undelivered history records transmitted from the first information processing apparatus 110 to the second information processing apparatus 130, thus alleviating the load of communication.

The second embodiment and its variations have been discussed above. In the above explanation, a failed action is re-executed by the same apparatus that has failed to do that action. This feature may, however, be modified such that the action is re-executed by another apparatus. For example, the secondary apparatus may be configured to execute an action upon receipt of an action end notice that indicates failed execution of the action. In this case, the primary apparatus does not retry the failed action. This variation is included in the scope of the second embodiment.

Various embodiments and variations have been described above. In one aspect of the embodiments, the proposed techniques enable the two information processing apparatuses to smoothly switch their roles of executing actions and backing it up.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
   a communication interface configured to receive a notification indicating a processing status of an operation that another information processing apparatus executes, corresponding to a message entered thereto;
   a memory configured to store notifications received by the communication interface; and
   a processor configured to determine, upon expiration of a predetermined time after receipt of a message by the information processing apparatus, whether the memory contains a notification indicating a processing status of an operation corresponding to the received message, and avoid execution of an operation corresponding to the received message when the memory is determined to contain the notification.

2. The information processing apparatus according to claim 1, wherein:
   the communication interface receives a completion notice from said another information processing apparatus, the completion notice indicating completion of an operation corresponding to a message entered to said another information processing apparatus; and
   the processor avoids execution of an operation corresponding to a message that is received by the information processing apparatus, when a completion notice relevant to the received message is received from said another information processing apparatus.

3. The information processing apparatus according to claim 1, wherein:
said another information processing apparatus executes one of a plurality of different types of operations that corresponds to a message entered thereto;
the memory stores statistical data about execution times of the different types of operations that were executed successfully; and
the processor changes the predetermined time depending on the statistical data, when determining whether the information processing apparatus is to execute an operation whose type corresponds to a message that is received by the information processing apparatus.

4. A control method comprising:
receiving, by a computer, a notification indicating a processing status of an operation that an information processing apparatus executes, corresponding to a message entered thereto;
storing, by the computer, received notifications in a memory of the computer; and
determining, by the computer upon expiration of a predetermined time after receipt of a message by the computer, whether the memory contains a notification indicating a processing status of an operation corresponding to the receive message, and avoiding execution of an operation corresponding to the received message when the memory is determined to contain the notification.

5. A non-transitory computer-readable storage medium storing a program that causes a computer to perform a procedure comprising:
receiving a notification indicating a processing status of an operation that an information processing apparatus executes, corresponding to a message entered thereto;
storing received notifications in a memory of the computer; and
determining, upon expiration of a predetermined time after receipt of a message by the computer, whether the memory contains a notification indicating a processing status of an operation corresponding to the received message, and
avoiding execution of an operation corresponding to the received message when the memory is determined to contain the notification.

6. An information processing system comprising:
a first information processing apparatus; and
a second information processing apparatus,
wherein the first information processing apparatus includes:
a first processor configured to execute an operation corresponding to a message entered thereto and produce a notification indicating a processing status of the operation, and
a first communication interface configured to transmit the notification produced by the first processor to the second information processing apparatus, and
wherein the second information processing apparatus includes:
a second communication interface configured to receive notifications from the first information processing apparatus,
a memory configured to store the notifications received by the second communication interface, and
a second processor configured to determine, upon expiration of a predetermined time after receipt of a message by the second information processing apparatus, whether the memory contains a notification indicating a processing status of an operation corresponding to the received message, and avoid execution of an operation corresponding to the received message when the memory is determined to contain the notification.

7. The information processing system according to claim 6, wherein:
the first communication interface sends the first information processing apparatus a completion notice indicating completion of an operation corresponding to a message entered to the first information processing apparatus; and
the second processor avoids execution of an operation corresponding to a message that is received by the second information processing apparatus, when a completion notice relevant to the received message is received from the first information processing apparatus.

8. The information processing system according to claim 6, wherein:
the first processor executes one of a plurality of different types of operations that corresponds to the message entered to the first information processing apparatus;
the memory stores statistical data about execution times of the different types of operations that were executed successfully; and
the second processor changes the predetermined time depending on the statistical data, when determining whether the second information processing apparatus is to execute an operation whose type corresponds to a message that is received by the second information processing apparatus.

* * * * *